(12) United States Patent
Fukumoto et al.

(10) Patent No.: US 7,490,019 B2
(45) Date of Patent: Feb. 10, 2009

(54) METHOD AND APPARATUS FOR THREE-DIMENSIONAL MEASUREMENT

(75) Inventors: Tadashi Fukumoto, Ibaraki (JP); Koji Morimoto, Hashimoto (JP)

(73) Assignee: Konica Minolta Sensing, Inc., Sakai-Shi (JP)

( * ) Notice: Subject to any disclaimer, the term of this patent is extended or adjusted under 35 U.S.C. 154(b) by 0 days.

(21) Appl. No.: 11/643,203

(22) Filed: Dec. 21, 2006

(65) Prior Publication Data

US 2007/0150228 A1    Jun. 28, 2007

(30) Foreign Application Priority Data

Dec. 26, 2005    (JP)    ............... 2005-371511

(51) Int. Cl.
*G01C 9/14*    (2006.01)
(52) U.S. Cl. .................................... 702/150
(58) Field of Classification Search ............ 702/85, 702/90, 91, 94, 95, 99, 130, 150, 151, 152–155; 382/154; 73/1.79; 345/156
See application file for complete search history.

(56) References Cited

U.S. PATENT DOCUMENTS 5,610,846 A    3/1997    Trapet et al. ................. 702/95
6,064,759 A *  5/2000    Buckley et al. ............. 382/154
6,772,619 B2* 8/2004    Nashiki et al. ............. 73/1.79
2002/0084974 A1* 7/2002   Ohshima et al. ........... 345/156
2002/0150288 A1* 10/2002  Fujiwara .................... 382/154
2003/0007680 A1* 1/2003   Iijima et al. ................. 382/154

FOREIGN PATENT DOCUMENTS

JP    3447430    7/2003

* cited by examiner

*Primary Examiner*—Edward Raymond
*Assistant Examiner*—Mohamed Charioui
(74) *Attorney, Agent, or Firm*—Sidley Austin LLP

(57) ABSTRACT

A three-dimensional measurement method for conducting measurement of a three-dimensional shape of a surface of an object using a three-dimensional measuring device is provided. The method includes providing, in advance, a posture sensor that detects a posture of the three-dimensional measuring device, providing, in advance, a parameter table in which a parameter corresponding to a posture of the three-dimensional measuring device is stored, and calculating three-dimensional shape data of the object using measurement data and the parameter, the measurement data being obtained by conducting measurement of the object with the three-dimensional measuring device and the parameter being read out from the parameter table according to a posture of the three-dimensional measuring device upon the measurement.

15 Claims, 25 Drawing Sheets

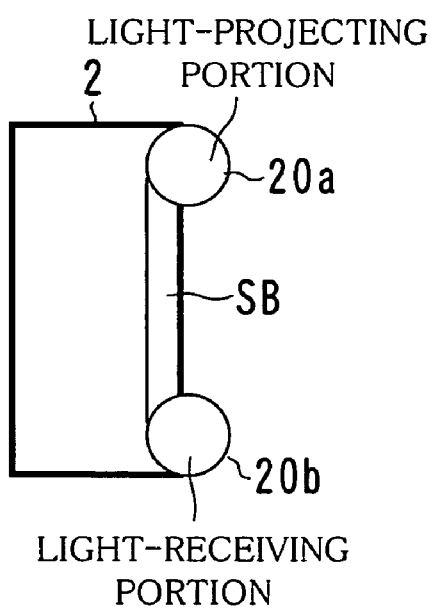
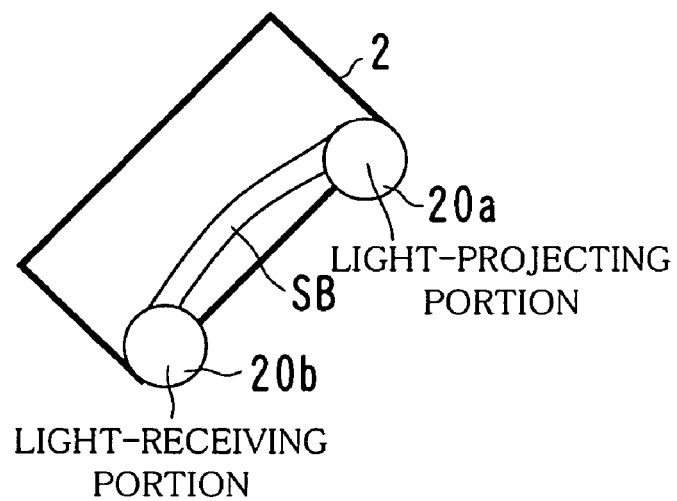
FIG. 7A
FIG. 7B

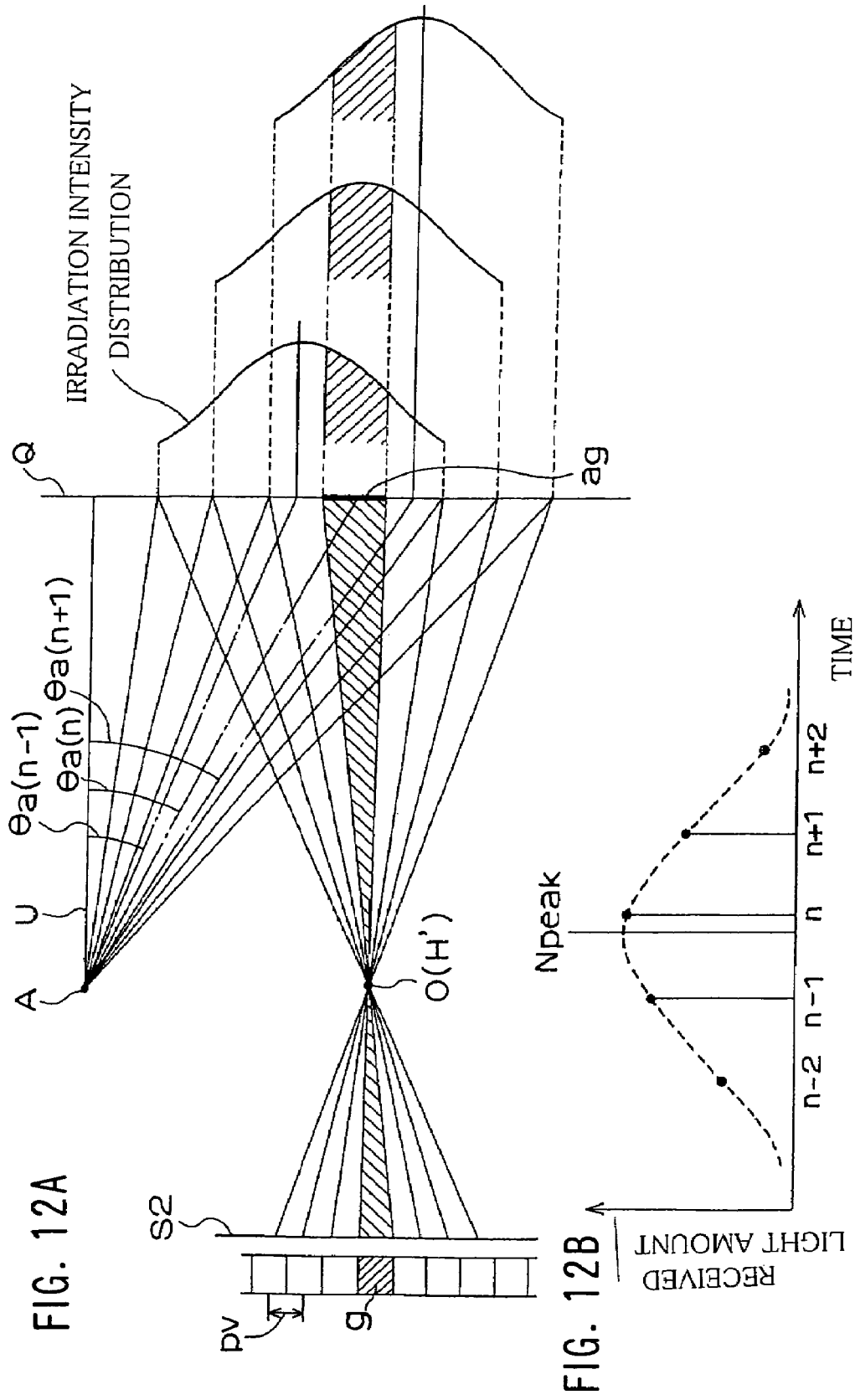

FIG. 16

PT1(PTK1,PTG1)

| | (°) | DOWNWARD | | | | | | | UPWARD | | | | | |
|---|---|---|---|---|---|---|---|---|---|---|---|---|---|---|
| | | 90 | 75 | 60 | 45 | 30 | 15 | 0 | 15 | 30 | 45 | 60 | 75 | 90 |
| LEFT-FACED | 90 | ■ | | | | | | | | | | | | |
| | 75 | | | | | | | | | | | | | |
| | 60 | | | | | | | | | | | | | |
| | 45 | | | | | | | | | | | | | |
| | 30 | | | | | | | | | | | | | |
| | 15 | | | | | | | | | | | | | |
| | 0 | | | | | | | | | | | | | |
| RIGHT-FACED | 15 | | | | | | | | | | | | | |
| | 30 | | | | | | | | | | | | | |
| | 45 | | | | | | | | | | | | | |
| | 60 | | | | | | | | | | | | | |
| | 75 | | | | | | | | | | | | | |
| | 90 | | | | | | | | | | | | | |

FIG. 17

PMK1

| PARAMETER NAME | PARAMETER VALUE | PARAMETER NAME | PARAMETER VALUE |
|---|---|---|---|
| pu | −0.000052 | the1 | 0.0249 |
| pv | 0.000049 | the2 | −0.0684 |
| u0 | 0.000002 | the3 | −0.0381 |
| v0 | −0.000004 | L | 0.00132 |

FIG. 18

PMG1

| PARAMETER NAME | PARAMETER VALUE |
|---|---|
| MAGNIFICATION IN X DIRECTION | 1.000100 |
| MAGNIFICATION IN Y DIRECTION | 1.000118 |
| MAGNIFICATION IN Z DIRECTION | 1.000243 |

FIG. 21

|  | UPWARD "b" DEGREES | UPWARD "a" DEGREES | UPWARD "c" DEGREES |
|---|---|---|---|
| LEFT-FACED "q" DEGREES |  | (CALCULATION A) |  |
| LEFT-FACED "p" DEGREES | (CALCULATION D) | (CALCULATION C) | (CALCULATION E) |
| LEFT-FACED "r" DEGREES |  | (CALCULATION B) |  |

METHOD AND APPARATUS FOR THREE-DIMENSIONAL MEASUREMENT

This application is based on Japanese patent application No. 2005-371511 filed on Dec. 26, 2005, the contents of which are hereby incorporated by reference.

BACKGROUND OF THE INVENTION

1. Field of the Invention

The present invention relates to a three-dimensional measurement method and a three-dimensional measurement apparatus for conducting measurement of a three-dimensional shape of an object surface using a non-contact three-dimensional measuring device such as an optical three-dimensional measuring device.

2. Description of the Related Art

Optical three-dimensional measuring devices have conventionally been used to conduct measurement of three-dimensional shapes of object surfaces for the purpose of visual inspection of the objects.

As the principles of general three-dimensional measuring devices, there are proposed a light section method using laser slit light or the like, a pattern projection method using pattern light, a stereoscopic method based on plural images obtained by image capturing of one object from plural different line-of-sight directions, a moiré method using moiré and others. The three-dimensional measuring devices obtain measurement data on an object using these measurement methods, perform three-dimensional calculation using the measurement data and various parameters and generate three-dimensional data (three-dimensional shape data) including three-dimensional coordinates (XYZ coordinates) and polygons of points on the object surface.

In the case of measurement with the three-dimensional measuring device, in order to obtain three-dimensional data of the entire surface of an object, it is necessary to conduct measurement with a position and posture of the three-dimensional measuring device variously changed for the object. To that end, the three-dimensional measuring device is held by a multi-joint manipulator such as a robot arm and measurement is conducted while the manipulator is controlled to change the relative position and posture between the object and the three-dimensional measuring device.

In such a case, the three-dimensional measuring device is held in various measurement postures such as an upward posture, a downward posture, sideways postures and a forward posture. On the assumption that the three-dimensional measuring device is used under such various measurement postures, it is so designed that a casing and important elements have sufficient rigidity to maintain measurement accuracy even if the measurement posture is changed. As shown in FIG. 7A, for example, in a three-dimensional measuring device using the light-section method, the rigidity of a light-projecting portion $20a$, a light-receiving portion $20b$ or a support member SB for coupling the light-projecting portion to the light-receiving portion to support them is especially important.

In the case where the measurement posture of the three-dimensional measuring device is changed variously, the balance of center-of-gravity inside the three-dimensional measuring device is also changed and a bend or strain occurs marginally even if the casing or the elements of the three-dimensional measuring device has sufficient rigidity. When such a slight bend or strain occurs in the light-projecting portion, the light-receiving portion or the support member all of which affect the measurement accuracy of the three-dimensional measuring device, the positional relationship between the light-projecting portion and the light-receiving portion becomes out of balance as shown in FIG. 7B, and thereby measurement data is affected.

For example, the posture when the three-dimensional measuring device faces the front, i.e., the posture at forward zero degrees, is regarded as the reference. When the posture of the three-dimensional measuring device is set to upward or downward, the support member SB is expanded or contracted compared to the case of zero degrees, or a measurement space is distorted. This phenomenon is called a "posture difference".

Incidentally, a user can conduct measurement of a three-dimensional object or the like to perform simple calibration in a three-dimensional measuring device in order to limit the influence of environmental changes such as temperature changes or changes with time upon the use of the three-dimensional measuring device. This is called "user calibrations". However, a measurement posture when the user calibration is performed is a predetermined posture and is sometimes different from a measurement posture when measurement is actually conducted. In such a case, even if the user calibration is performed with high accuracy, a posture difference occurs due to the different postures, so that the measurement accuracy is reduced.

For the purpose of preventing such reduction in measurement accuracy based on the posture difference, there is conventionally proposed a method in which a detection sensor measures a bend amount or an elongation amount of a frame of a three-dimensional measuring device or others and calibration parameters for data correction are calculated based on data on the measured bend amount or elongation amount (U.S. Pat. No. 5,610,846).

According to the above-described conventional method in which a bend amount is measured, the actual bend amount or elongation amount is a slight amount of a few micrometers or less in many cases and detection with a detection sensor is difficult or high-accuracy detection is impossible. Thus, it is extremely hard to perform appropriate calibration by the conventional method.

Further, since the point where a bend or elongation is generated in a three-dimensional measuring device is not limited to one point, many detection sensors are required to measure all the bend amounts or all the elongation amounts accurately. This causes three-dimensional measuring devices to increase in size and cost.

Besides, since the relationship between bend amounts or elongation amounts in plural points and measurement errors is complicated in many cases, it is extremely difficult to accurately associate the bend amounts or elongation amounts with the measurement errors for each posture of a measuring device. For this reason, although much calibration data corresponding to each of the points and enormous calculation are required, proper correction with high accuracy cannot be expected.

Meanwhile, there is proposed a method in which mechanical rigidity of a casing or a support member of a three-dimensional measuring device is further improved, strain occurrence is prevented as much as possible and measurement errors are minimized. In such a case, however, a trade-off is inevitable in which the volume and the weight of the three-dimensional measuring device are increased and the material is changed to an expensive material having high rigidity.

SUMMARY

The present disclosure is directed to solve the problems pointed out above, and therefore, an object of an embodiment of the present invention is to conduct three-dimensional measurement with high accuracy by simply and precisely correcting an error of measurement data occurring when a posture of a three-dimensional measuring device is variously changed.

According to an embodiment of the present invention, a three-dimensional measurement method for conducting measurement of a three-dimensional shape of a surface of an object using a three-dimensional measuring device is provided. The method includes providing, in advance, a posture sensor that detects a posture of the three-dimensional measuring device, providing, in advance, a parameter table in which a parameter corresponding to a posture of the three-dimensional measuring device is stored, and calculating three-dimensional shape data of the object using measurement data and the parameter. The measurement data is obtained by conducting measurement of the object with the three-dimensional measuring device and the parameter is read out from the parameter table according to a posture of the three-dimensional measuring device upon the measurement.

Preferably, the parameter stored in the parameter table may be used for determining three-dimensional coordinates of each point on the surface of the object based on the measurement data and the parameter stored in the parameter table is a calibration parameter that is calibrated according to a posture of the three-dimensional measuring device.

According to an embodiment of the present invention, a three-dimensional measurement apparatus for conducting measurement of a three-dimensional shape of a surface of an object is provided. The apparatus includes a three-dimensional measuring device that conducts measurement of the three-dimensional shape of the surface of the object to obtain measurement data, a posture sensor that detects a posture of the three-dimensional measuring device, a parameter table in which a parameter corresponding to a posture of the three-dimensional measuring device is stored, a selection portion that selects and reads out from the parameter table a parameter corresponding to a posture of the three-dimensional measuring device upon the measurement, and an operation portion that calculates three-dimensional shape data of the object using the measurement data and the parameter read out from the parameter table.

Thus, according to an embodiment of the present invention, a mechanical bend amount or elongation amount of structural elements of a three-dimensional measuring device is not directly measured, and a posture of the three-dimensional measuring device upon measurement, e.g., an angular posture of the three-dimensional measuring device in a three-dimensional space is measured. A flash memory or the like in the three-dimensional measuring device stores, in advance, a parameter table that stores parameters corresponding to various measurement postures of the three-dimensional measuring device. Then, measurement data and calibration parameters corresponding to postures upon measurement are used to perform three-dimensional calculation, and thereby to generate three-dimensional data. Differently, error correction parameters corresponding to postures upon measurement are applied to three-dimensional data generated by three-dimensional calculation using measurement data, so that operation for correcting errors is performed. Differently, both the calibration and the error correction are performed.

An embodiment of the present invention enables three-dimensional measurement with high accuracy by simply and precisely correcting an error of measurement data occurring when a posture of the three-dimensional measuring device is variously changed.

These and other characteristics and objects of the present invention will become more apparent by the following descriptions of preferred embodiments with reference to drawings.

BRIEF DESCRIPTION OF THE DRAWINGS

FIGS. 7A and 7B are schematic diagrams of strain occurring inside the three-dimensional measuring device due to a change in posture.

FIGS. 12A and 12B are principle diagrams of calculation of three-dimensional coordinates in the three-dimensional measurement system.

FIG. 16 shows an example of a parameter table.

FIG. 17 shows an example of calibration parameters.

FIG. 18 shows an example of error correction parameters.

FIG. 21 shows an example of correction calculation of parameters.

DESCRIPTION OF THE PREFERRED EMBODIMENTS

Figure 1:
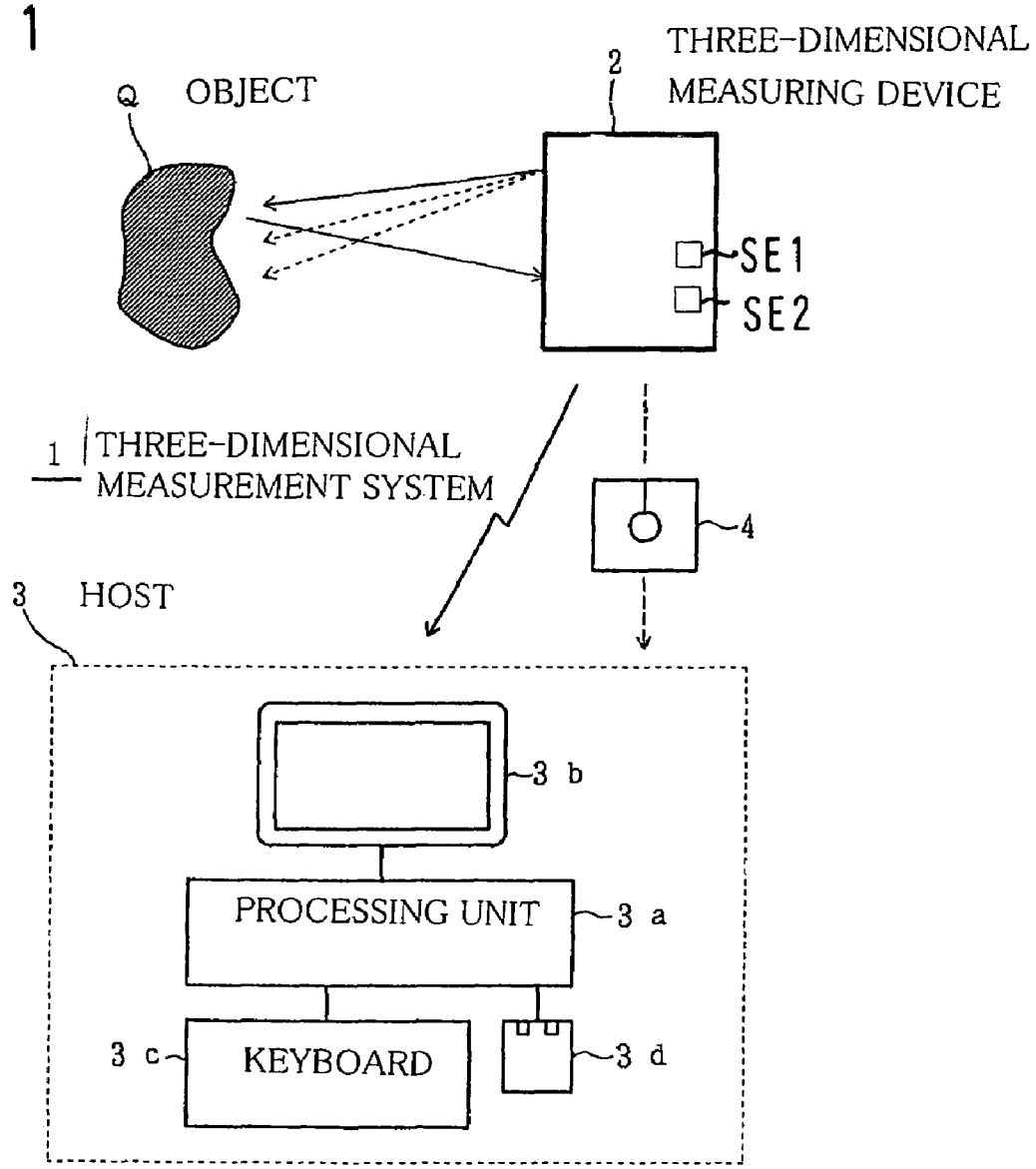
FIG. 1 is a diagram showing a structure example of a three-dimensional measurement system according to an embodiment of the present invention.

As shown in FIG. 1, the three-dimensional measurement system 1 includes a three-dimensional measuring device 2 for conducting measurement of a three-dimensional shape of a surface of an object Q using a slit light projection method and a host 3 for processing output data from the three-dimensional measuring device 2.

The three-dimensional measuring device 2 outputs measurement data (also called slit image data) for specifying three-dimensional coordinates of plural sampling points on the surface of the object Q. In addition, the three-dimensional measuring device 2 also outputs a two-dimensional image showing color information of the object Q, parameters necessary for calculation of the three-dimensional coordinates of the sampling points, data necessary for calibration and others. The host 3 uses the data and the parameters to determine the three-dimensional coordinates (three-dimensional positions) of the sampling points by calculation using a triangulation method. Upon the calculation of the three-dimensional coordinates, a camera line-of-sight equation and a detected light plane equation and others are used.

Further, the three-dimensional measuring device 2 is provided with a posture sensor SE1 for detecting a posture of the three-dimensional measuring device 2 upon measurement and a temperature sensor SE2 for detecting a temperature. The posture sensor SE1 detects an angular posture of the three-dimensional measuring device 2 in a three-dimensional space when measurement is conducted, i.e., when measurement data D1 is obtained, and then outputs posture data. The temperature sensor SE2 detects an ambient temperature of the three-dimensional measuring device 2 to output temperature data D3. The details will be described later.

The host 3 is a computer system including a processing unit 3a, a display 3b, a keyboard 3c and a mouse 3d. Memories such as a ROM and a RAM are mounted on the processing unit 3a. Software for processing the measurement data D1 is installed in those memories. The memories of the processing unit 3a store parameters and various equations or arithmetic expressions used for calculation of three-dimensional coordinates described later. Data can be exchanged between the host 3 and the three-dimensional measuring device 2 through online and offline using a portable recording medium 4. A magneto-optical disk, a memory card or the like is used as the recording medium 4.

The three-dimensional measurement system 1 shown in FIG. 1 is made up of the three-dimensional measuring device 2 and the host 3 that are independent of each other. Instead, however, a three-dimensional measurement system (three-dimensional measurement apparatus) may be made up by incorporating the functions of the host 3 into the three-dimensional measuring device 2.

Figure 2A:
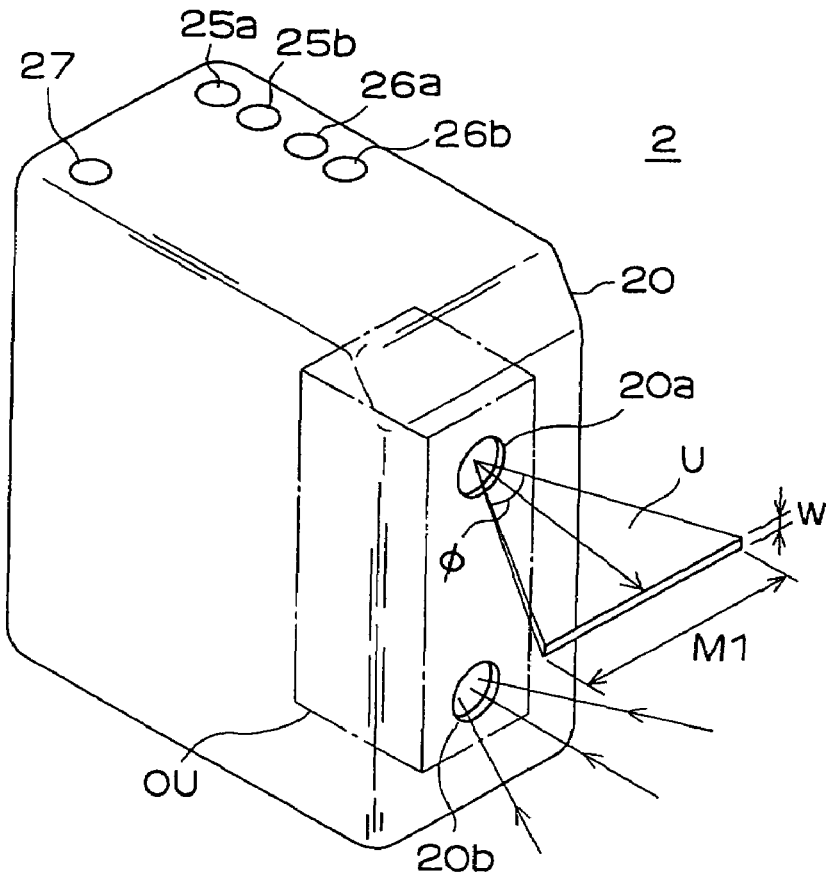
FIGS. 2A and 2B are perspective views showing appearance of a three-dimensional measuring device according to an embodiment of the present invention.

Referring to FIG. 2A, the three-dimensional measuring device 2 includes a substantial rectangular parallelepiped shaped housing 20 containing an optical unit OU. The housing 20 has a light-projecting window 20a and a light-receiving window 20b on its front face. The light-projecting window 20a is provided at a predetermined distance above the light-receiving window 20b. The optical unit OU emits slit light U that is a laser beam spreading in the horizontal direction. Stated differently, the slit light U is planar light that spreads at an emission angle $\phi$ in the horizontal direction and has a width w along the vertical direction. The length M1 of the slit light U in the horizontal direction changes depending on a distance from the light-projecting window 20a. The slit light U travels to an object Q as a measurement target. The slit light U is reflected from the surface of the object Q and a part of the reflected light passes through the light-receiving window 20b and is incident on the optical unit OU.

Figure 2B:
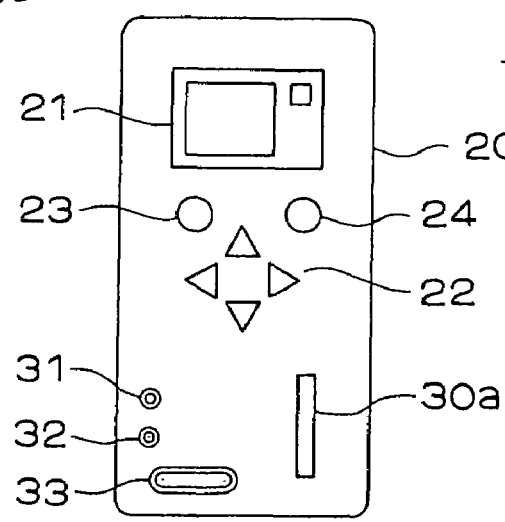

The housing 20 has, on its upper face, zoom buttons 25a and 25b, manual focus buttons 26a and 26b, and a shutter button 27. As shown in FIG. 2B, the housing 20 has, on its rear face, a liquid crystal display (LCD) 21, cursor buttons 22, a select button 23, a cancel button 24, analogue output terminals 31 and 32, a digital output terminal 33, and a slot 30a for inserting the recording medium 4.

The liquid crystal display 21 is used as a display portion for an operation screen and an electronic viewfinder. A user can use the buttons 21-24 provided on the rear face of the housing 20 to set an image capturing mode. Two-dimensional image signals are outputted from the analogue output terminals 31 and 32. Measurement data D1 is outputted from the digital output terminal 33.

The three-dimensional measuring device 2 is generally fixed to a robot arm, a support mechanism or the like with a flange member provided on the bottom of the housing 20. Stated differently, concerning all postures of the three-dimensional measuring device 2 upon measurement, the entire three-dimensional measuring device 2 is supported by the flange member provided on the bottom of the housing 20.

Figure 3:
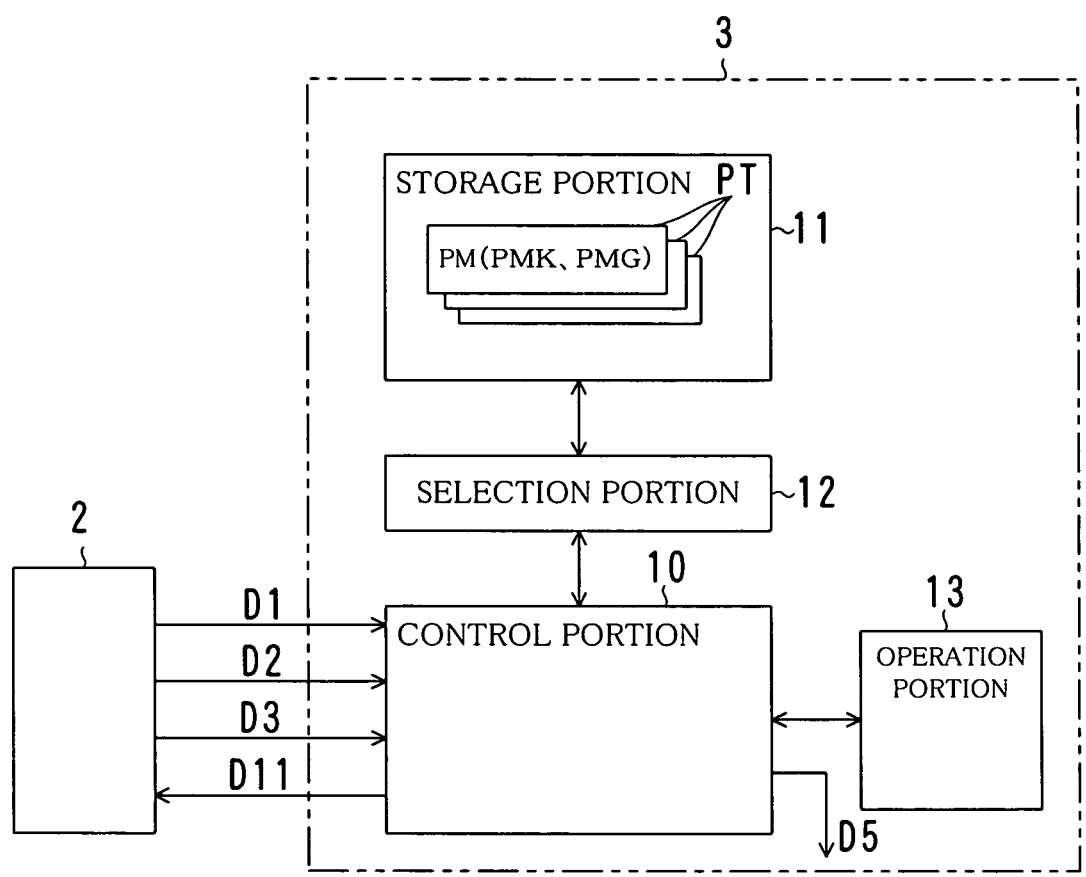
FIG. 3 is a block diagram showing general functions relating to a process for measurement data.

Referring to FIG. 3, the host 3 includes a control portion 10, a storage portion 11, a selection portion 12 and an operation portion 13.

The control portion 10 performs various control processes for three-dimensional measurement, e.g., supervises a series of processes for performing three-dimensional calculation on the measurement data D1 to obtain three-dimensional data (three-dimensional shape data) D5. For example, the control portion 10 receives the measurement data D1, posture data D2, temperature data D3, and other data or signals, all of which are outputted from the three-dimensional measuring device 2, and stores the received data or signals in an appropriate memory area. The control portion 10 transfers the data to each portion if necessary. Further, the control portion 10 outputs various setting signals or data D1 such as parameters PM to the three-dimensional measuring device 2.

The storage portion 11 stores various parameter tables PT in which various parameters PM corresponding to postures of the three-dimensional measuring device 2 and temperatures are stored. In this embodiment, a calibration parameter table PTK, an error correction parameter table PTG and others are provided as the parameter tables PT. A magnetic disk device, a semiconductor memory or other various storage devices or storage media is used as the storage portion 11.

The calibration parameter table PTK stores calibration parameters PMK. The calibration parameters PMK are used for determining three-dimensional coordinates of each point on the surface of the object Q based on the measurement data D1. The calibration parameters PMK are parameters PM that are calibrated according to a posture of the three-dimensional measuring device 2 or according to the posture and a temperature.

The error correction parameter table PTG stores error correction parameters PMG. The error correction parameters PMG are parameters PM for correcting, depending on a posture of three-dimensional measuring device 2, errors of three-dimensional coordinates of each point on the surface of the object Q that are determined based on the measurement data D1.

Note that, as described later, these parameter tables PT store the parameters PM discretely with respect to postures of the three-dimensional measuring device 2 or temperatures. Although the parameters PM are stored discretely, the accuracy is increased and proper three-dimensional measurement data D5 can be obtained with reducing a pitch (an interval) between postures or temperatures and increasing the number of data.

The selection portion 12 selects and reads, from the parameter tables PT, parameters PM corresponding to a posture of the three-dimensional measuring device 2 upon measurement and a temperature. Various methods are proposed as the selection method with the selection portion 12. Some examples of the various methods follow: 1. One parameter PM closest to that of the posture of the three-dimensional measuring device 2 or closest to that of the temperature is selected from each of the parameter tables PM. 2. Plural parameters close to that of the posture of the three-dimensional measuring device 2 or close to that of the temperature are selected from each of the parameter tables PM. In the latter case, the operation portion 13 determines three-dimensional data D5 of the object Q by calculation using a respective one of parameters PM determined, by interpolation operation, from the plural parameters PM selected by the selection portion 12.

The operation portion 13 calculates three-dimensional data D5 of the object Q using the measurement data D1 and the parameters PM. The measurement data D1 is obtained by conducting measurement of the object Q with the three-dimensional measuring device 2. The parameters PM are read from the parameter tables PM depending on the posture of the three-dimensional measuring device 2 upon measurement and the temperature. The process details in the operation portion 13 will be detailed later.

In the case where the functions of the host 3 are incorporated into the three-dimensional measuring device 2, such a structure of a three-dimensional measuring device 2B is, for example, as follows.

Figure 4:
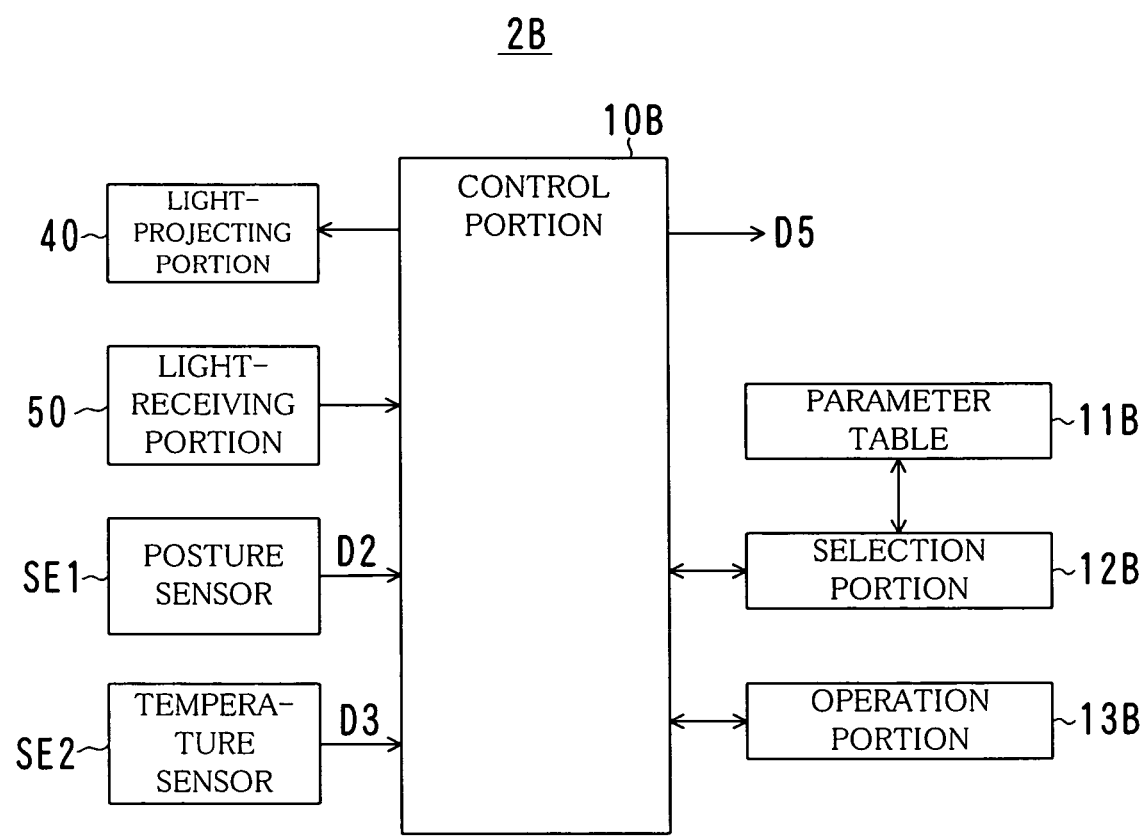
FIG. 4 is a block diagram, corresponding to FIG. 3, of a three-dimensional measuring device into which all the functions are incorporated.

Referring to FIG. 4, the three-dimensional measuring device 2B includes a control portion 10B, a storage portion 11B, a selection portion 12B and an operation portion 13B. Functions of the respective portions are almost the same as those of the control portion 10, the storage portion 11, the selection portion 12 and the operation portion 13 that are described earlier. The control portion 10B outputs control signals or setting signals for the light-projecting portion 40. Measurement data D1 is generated based on data obtained by the light-receiving portion 50 and the measurement data D1 thus generated is inputted to the control portion 10B. Posture data D2 from the posture sensor SE1 and temperature data D3 from the temperature sensor SE2 are also inputted to the control portion 10B.

The control portion 10B, the selection portion 12B, the operation portion 13B or others can be achieved by program execution with the CPU or the DSP, or by combination with an appropriate hardware circuit. A flash memory or various types of media cards can be used as the storage portion 11B.

The following is a description of an expression method of a posture of the three-dimensional measuring device 2, the posture sensor SE1 and the temperature sensor SE2.

Figure 5:
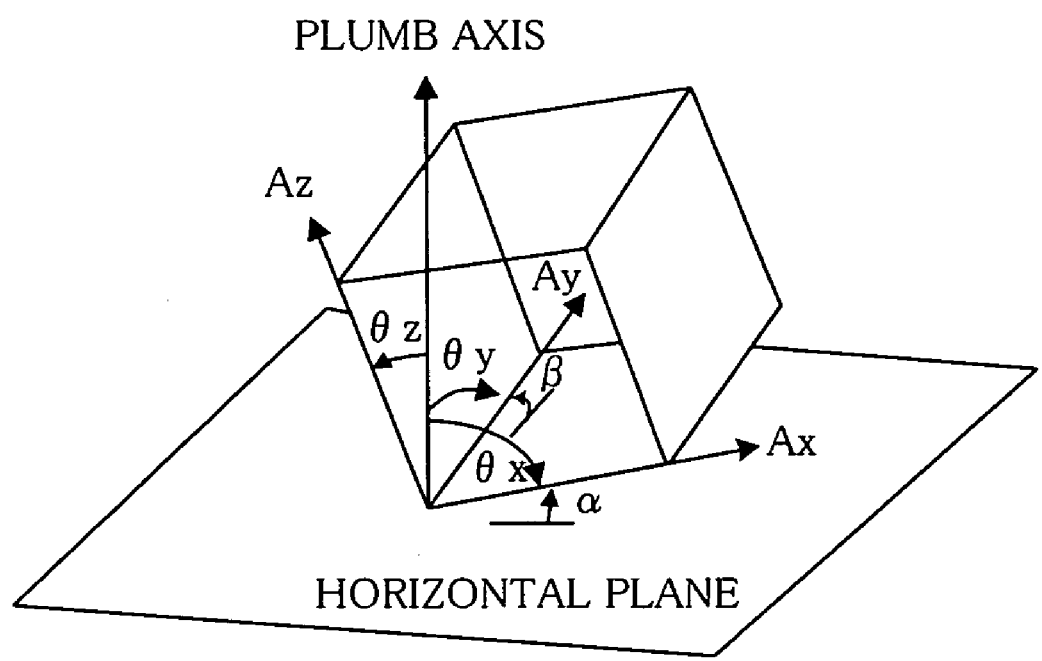
FIG. 5 is a schematic diagram of an expression method of a posture in a three-dimensional space.

Referring to FIG. 5, a posture of a cube is shown by angular positions with respect to the horizontal plane and the plumb line. More specifically, as shown in FIG. 5, one vertex of the cube is on the horizontal plane, and three axes Ax, Ay and Az of the cube, which are orthogonal to one another, have angles of θx, θy and θz respectively with respect to a perpendicular standing on the vertex. In such a case, the axes Ax and Ay have angles of α (=90 degrees−θx) and β (=90 degrees−θy) with respect to the horizontal plane, respectively. The posture of the cube is indicated by the two angles α and β. It is unnecessary to allow for angular positions in the horizontal plane, i.e., angles around the perpendicular. This is because even if the angles around the perpendicular have any values, the angles do not cause a change in influence on the three-dimensional measuring device 2 due to the gravity.

Figures 6A, 6B, 6C:
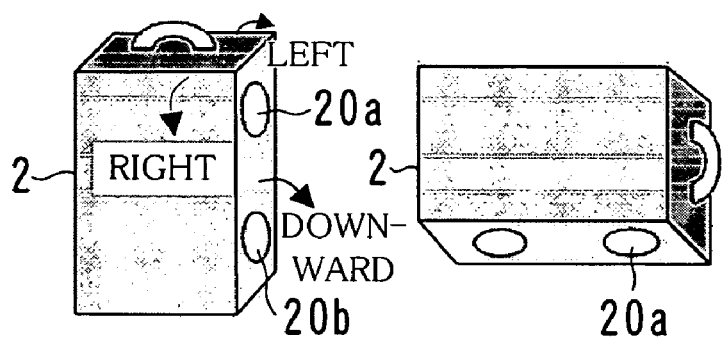
FIGS. 6A-6C are diagrams showing various postures of the three-dimensional measuring device.

The posture of the three-dimensional measuring device 2 shown in FIG. 6A is the forward state and the angles α and β, which are described above, have a value of zero respectively. Under this state, the three-dimensional measuring device 2 can conduct measurement of an object Q that is located ahead in the horizontal direction. This state is set to a "reference posture". In FIG. 6A, if the three-dimensional measuring device 2 is inclined at 90 degrees to the right side, it faces downward, and if it is inclined at 90 degrees to the left side, it faces upward. If the three-dimensional measuring device 2 is inclined at 90 degrees to far side in the drawing (the left side of the three-dimensional measuring device 2), it faces left, and if it is inclined at 90 degrees to this side (the right side of the three-dimensional measuring device 2), it faces right.

The posture of the three-dimensional measuring device 2 shown in FIG. 6B is a downward posture of 90 degrees. Under this state, the three-dimensional measuring device 2 can conduct measurement of an object Q that is located directly therebelow. The posture of the three-dimensional measuring device 2 shown in FIG. 6C is an upward posture of 90 degrees. Under this state, the three-dimensional measuring device 2 can conduct measurement of an object Q that is located directly thereabove. Other than those, the three-dimensional measuring device 2 can be made to take various postures.

As shown in FIG. 7A, in the case where the posture of the three-dimensional measuring device 2 is the forward posture, no strain occurs in the support member SB. As shown in FIG. 7B, however, in the case where the three-dimensional measuring device 2 is inclined, strain or bend occurs in the support member SB, which affects the accuracy of measurement data D1.

For this reason, as described earlier, the posture sensor SE1 is provided in order to detect the posture of the three-dimensional measuring device 2 upon measurement.

An acceleration sensor is used as the posture sensor SE1, for example. A sensor using a resistance effect of a semiconductor piezoelectric element is used as the acceleration sensor, for example. In such an acceleration sensor, a tensile stress is generated depending on acceleration and strain occurs in a crystal lattice of the semiconductor piezoelectric element, so that a resistance value is changed. The change in resistance value is reflected in output voltage levels Ax, Ay and Az in the directions of X, Y and Z, respectively. Accordingly, the following equations are used for conversion into postures (angles) as shown in FIG. 5.

$$\theta x = \cos^{-1} Ax/g$$

$$\theta y = \cos^{-1} Ay/g$$

$$\theta z = \cos^{-1} Az/g$$

$$g = \sqrt{Ax^2 + Ay^2 + Az^2}$$

Figure 8:
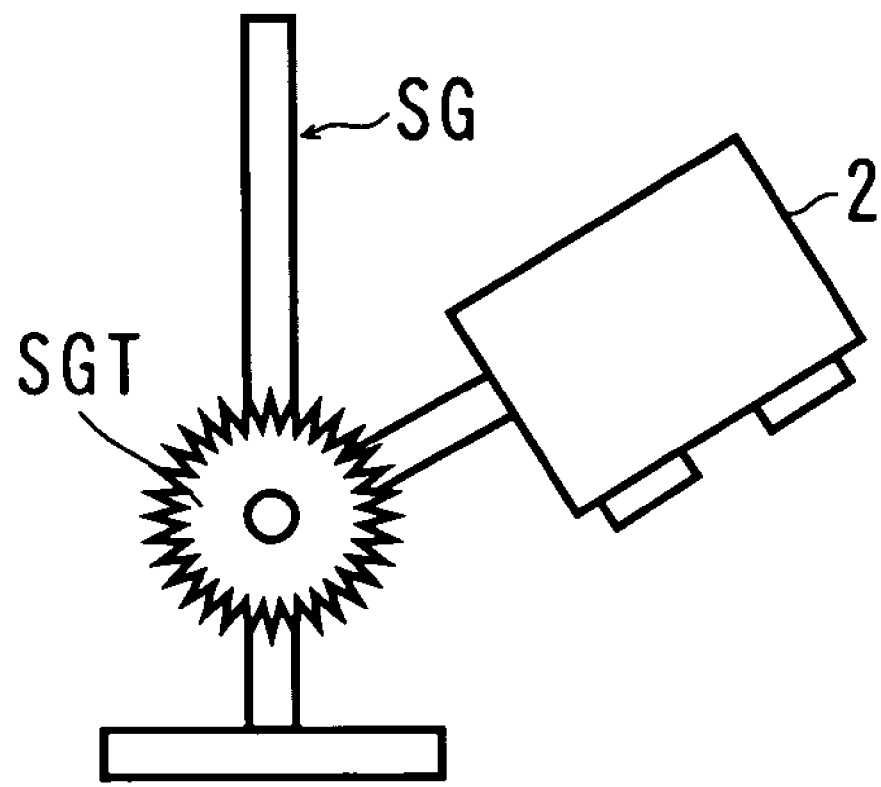
FIG. 8 is a diagram showing another example of a method for detecting a posture of the three-dimensional measuring device.

In the case where measurement is conducted by using a measurement jig capable of adjusting a measurement posture and by attaching the three-dimensional measuring device 2 to such a measurement jig, as shown in FIG. 8, it is possible to convert the mechanical position of a posture adjusting mechanism (e.g., a gear) SGT of a measurement jig SG into electrical signals and to input the electrical signals to the control portion 10.

Figure 9:
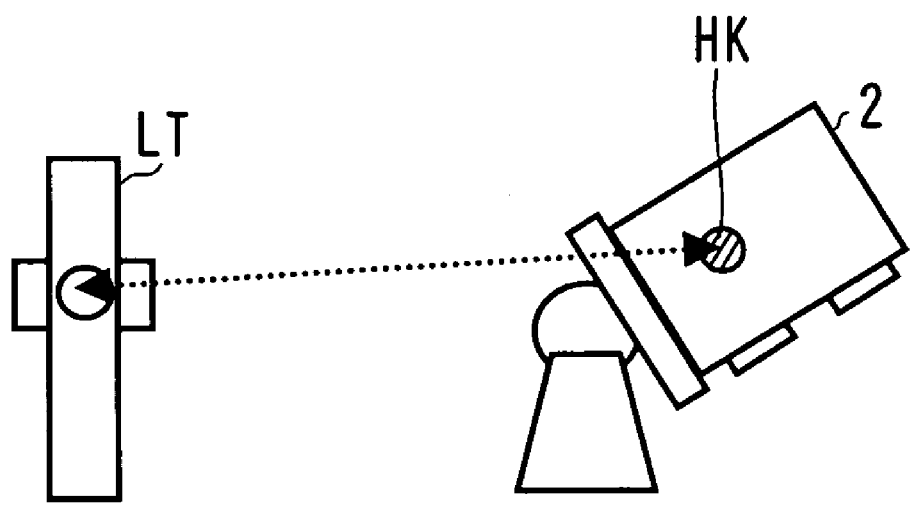
FIG. 9 is a diagram showing yet another example of a method for detecting a posture of the three-dimensional measuring device.

Differently, as shown in FIG. 9, it is possible to use an external detection sensor independent of the three-dimensional measuring device 2, e.g., to use a laser tracker. Referring to FIG. 9, a reflector HK is fixed to the three-dimensional measuring device 2. Laser light emitted from a laser tracker LT is reflected by the reflector HK. Then, the reflected light is detected, so that a posture of the three-dimensional measuring device 2 can be detected. The laser tracker LT itself is available commercially and known.

In the case where the laser tracker LT can detect the position of the three-dimensional measuring device 2 and plural pieces of three-dimensional data D5 are combined which are based on measurement data D1 obtained by conducting measurement of an object Q from different positions with the three-dimensional measuring device 2, it is possible to use the position of the three-dimensional measuring device 2 that is posture data D2 and is detected by the laser tracker LT.

As a further different method for detecting a posture of the three-dimensional measuring device 2, two of the three-dimensional measuring devices 2 can be used. In such a case, one can be used for measurement of an object Q and the other can be used for detection of a posture of the three-dimensional measuring device 2.

As described above, an external detection sensor independent of the three-dimensional measuring device 2 is used. Thereby, in the case where measurement of an object Q is conducted with the position of the three-dimensional measuring device 2 changed, plural pieces of measurement data D1 for the entire object Q are integrated into one coordinate system so that one piece of three-dimensional data D5 for the object Q is easily generated.

The following is a description of the principle of three-dimensional measurement, details of three-dimensional calculation and others in the three-dimensional measurement system 1.

Figure 10A:
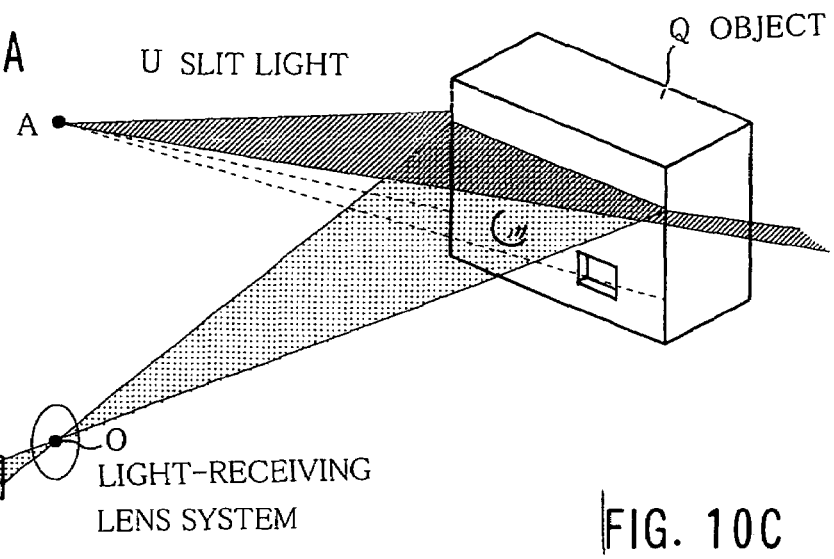
FIGS. 10A-10D are diagrams showing the outline of a slit light projection method.
Figure 10B:
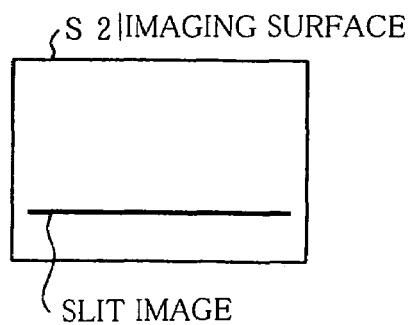
Figure 10C:
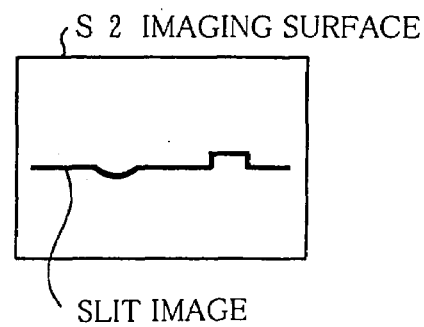
Figure 10D:
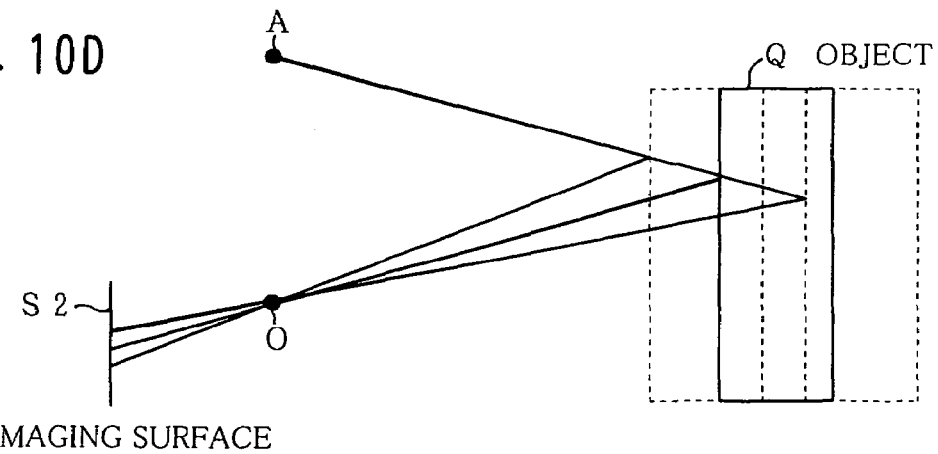

Referring to FIG. 10A, slit light U is projected onto an object Q and the light reflected from the object Q is made to be incident on an imaging surface S2 of an imaging element (an image sensor). If the irradiated part of the object Q is flat, then a captured image (a slit image) is linear as shown in FIG. 10B. If the irradiated part is uneven, then a captured image is a line having a bend or steps as shown in FIG. 10C. In short, the length of the distance between the three-dimensional measuring device 2 and the object Q is reflected in an incident position on the imaging surface S2 of the reflected light as shown in FIG. 10D. The slit light U is deflected in the width direction thereof (the vertical direction in the drawing). Thereby, the surface of the object Q is scanned, so that three-dimensional coordinates can be sampled.

Figure 11A:
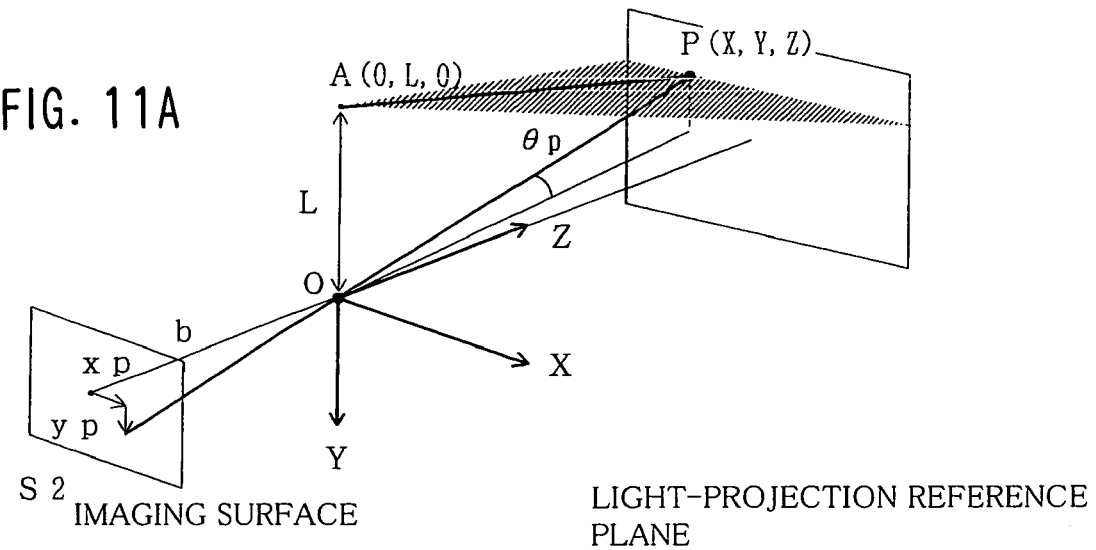
FIGS. 11A-11C are diagrams for explaining the principle of three-dimensional measurement using the slit light projection method.
Figure 11B:
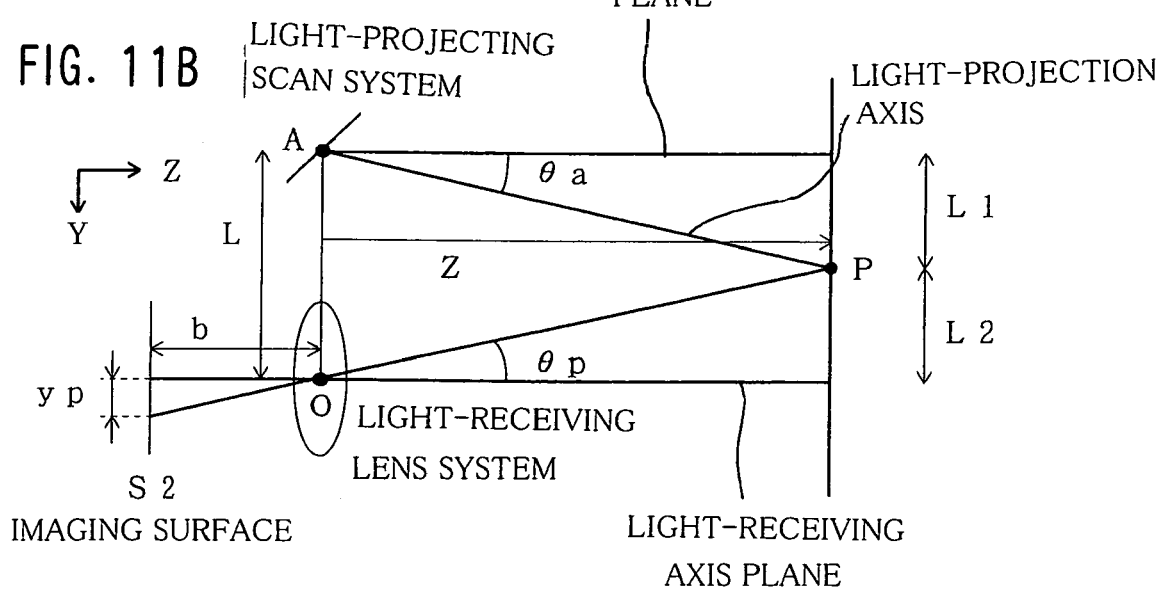
Figure 11C:
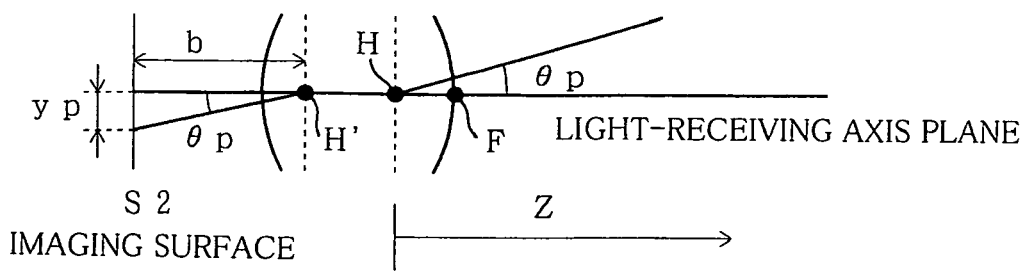

Referring to FIGS. 11A-11C, a light-projecting system and a light-receiving system are so placed that the baseline AO connecting the origin A of light-projection and the principal point O of a lens of the light-receiving system is perpendicular to a light-receiving axis. The light-receiving axis is perpendicular to the imaging surface S2. Note that the principal point of the lens is a point (back principal point) that is on the light-receiving axis and is away from the imaging surface S2 by an image distance b when an image of a finite object is imaged on the imaging surface S2. Hereinafter, the image distance b is sometimes referred to as an effective focal length Freal.

The principal point O is set to be the origin of the three-dimensional orthogonal coordinate system. The light-receiving axis is Z-axis, the baseline AO is Y-axis, and the length direction of the slit light is X-axis. In the case where the angle between a light-projection axis and a light-projection reference plane (a light-projection plane parallel to the light-receiving axis) is denoted by θa and an acceptance angle is denoted by θp when a point P (X, Y, Z) on an object is irradiated with the slit light U, the coordinate Z of the point P is defined by the following equation (1).

$$\text{Baseline length } L = L1 + L2 = Z \tan \theta a + Z \tan \theta p \therefore Z = L/(\tan \theta a + \tan \theta p) \quad (1)$$

Note that the acceptance angle θp is the angle formed by the line connecting the point P and the principal point O and a plane including the light-receiving axis (light-receiving axis plane).

An image magnification β is b/Z. Accordingly, supposing that the distance between the center of the imaging surface S2 and a light-receiving pixel in the X direction is denoted by xp and the distance therebetween in the Y direction is denoted by yp (see FIG. 11A), the coordinates X and Y of the point P are defined by the following equations (2) and (3).

$$X = xp/\beta \quad (2)$$

$$Y = yp/\beta \quad (3)$$

The angle θa is determined from an angular velocity of deflection of the slit light U. The acceptance angle θp can be calculated from the following relationship:

$$\tan \theta p = b/yp$$

Stated differently, the position (xp, yp) on the imaging surface S2 is measured and, thereby three-dimensional coordinates of the point P can be determined based on the angle θa upon the measurement of the position on the imaging surface S2.

In this way, three-dimensional data D5 using the light-projection method can be determined relatively easily by calculation. Upon the calculation, various parameters such as camera parameters or light-projecting optical system parameters are used and the camera line-of-sight equation and the detected light plane equation and others are used.

The description described above is premised on the use of an ideal thin lens system. In an actual thick lens system, the principal point O is provided in the form of a front principal point H and a back principal point H' as shown in FIG. 11C.

An object Q is irradiated with slit light U having a relatively large width corresponding to plural pixels on the imaging surface S2 of the image sensor. Specifically, the slit light U is set to have a width corresponding to five pixels. The slit light U is so deflected that it moves on the imaging surface S2 from top to bottom by one pixel pitch pv every sampling period. Thereby, the object Q is scanned. The image sensor outputs photoelectric conversion information for one frame every sampling period.

When one pixel g on the imaging surface S2 is noted, effective received light data is obtained in five times of sampling operation out of N times of sampling operation that is performed during the scanning process. The timing when an optical axis of the slit light U passes through an object surface ag in a range viewed by the target pixel g (temporal center-of-gravity Npeak: time when the received light amount of the target pixel g is the maximum) is determined by interpolation operation on the received light data for the five times of sampling operation. In the example shown in FIG. 12B, the received light amount is the maximum at the timing between the n-th time and the previous (n−1)th time. The position (coordinates) of the object Q is calculated based on the relationship between the projection direction of the slit light and the incidence direction of the slit light on the target pixel g at the determined timing. Thereby, measurement of a resolution higher than the resolution defined by the pixel pitch pv on the imaging surface can be realized.

For example, the three-dimensional measuring device 2 outputs to the host 3 the received light data for five times as the measurement data D1 for each pixel g of the image sensor. Then, the host 3 calculates coordinates of the object Q based on the measurement data D1.

Figure 13:
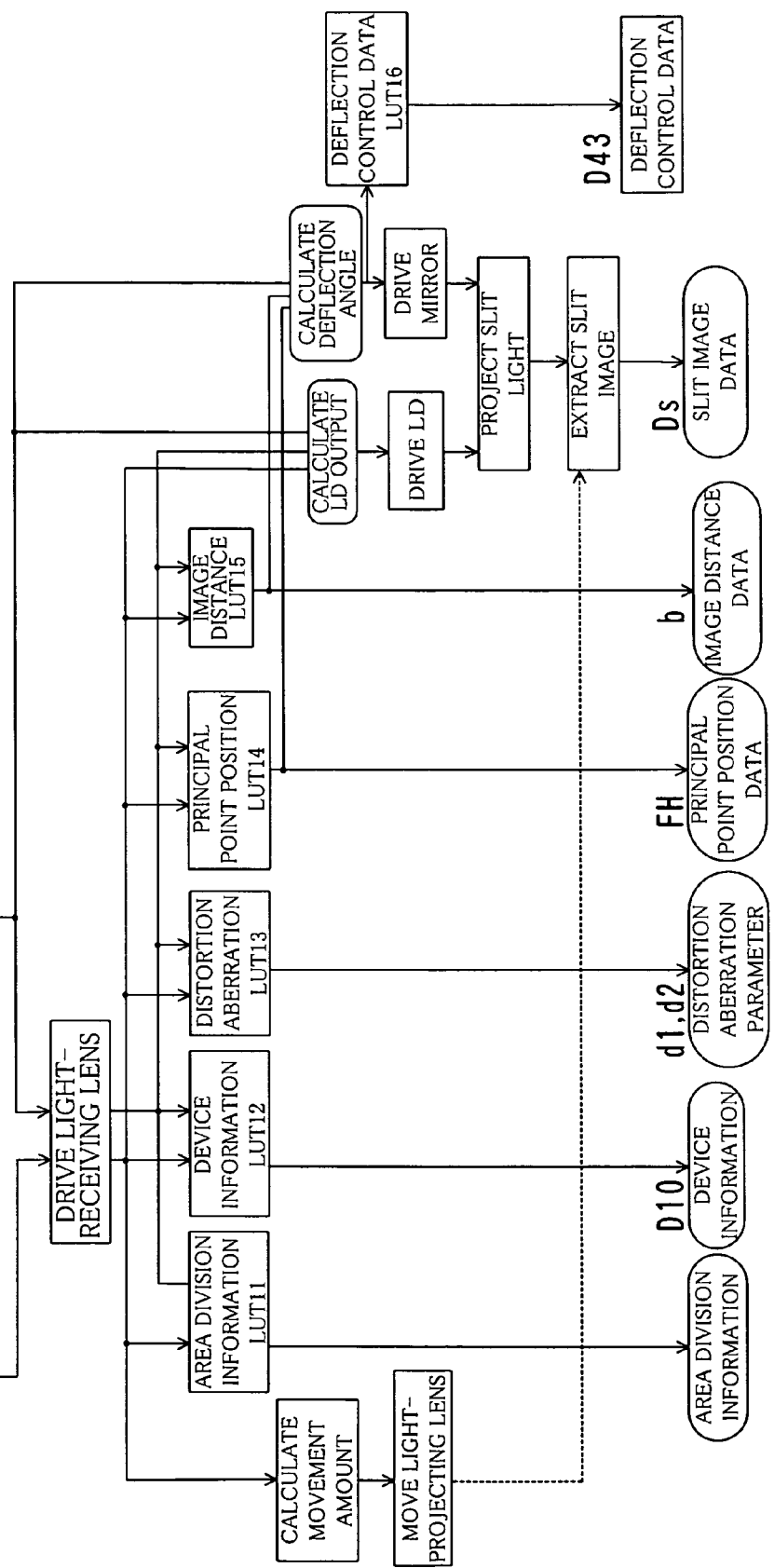
FIG. 13 is a diagram showing the flow of data in the three-dimensional measuring device.

Referring to FIG. 13, in accordance with operation for selecting an angle of view by a user, i.e., zoom operation, a variator part of a zoom unit moves and focusing is performed by moving a focusing part. An approximate distance $d_0$ away from the object is measured in the focusing process. Along with such a lens drive of the light-receiving system, a movement amount of a variator lens on the light-projection side is calculated by operation and movement control of the variator lens is performed based on the calculation result. The lens control on the light-projection side is to make the slit light U having a width corresponding to five pixels be incident on the image sensor regardless of the imaging distance and the angle of view.

In the three-dimensional measuring device 2, a distortion aberration table LUT13, a principal point position LUT14 and an image distance LUT15 are referred to and imaging condition data that are parameters corresponding to a movement amount Ed and a zoom increment value fp are outputted to the host 3. Here, the imaging condition data are distortion aberration parameters (lens distortion correction coefficients d1 and d2), a front principal point position FH and the image distance b. The front principal point position FH is represented by the distance between a front end point F of a zoom unit 51 and the front principal point H (see FIG. 11C). Since the front end point F is fixed, the front principal point H can be specified by the front principal point position FH.

In some cases, auxiliary measurement in which the slit light U is projected in a specific direction to measure a measurement environment is conducted and a distance d away from the object is determined based on image information obtained by the auxiliary measurement. Then, based on the distance d away from the object, the movement amount Ed is reset, a lens drive is performed and operation setting for actual measurement is performed. The setting items include output of semiconductor laser (laser light intensity), deflection conditions of the slit light U (a projection start angle, a projection completion angle and a deflection angular velocity). Upon calculation of the distance d away from the object, consideration is given to offset doff between the front principal point H of the light-receiving system that is the measurement reference point and the origin A of light-projection in the Z direction. Upon calculation of the deflection conditions, over-scanning of a predetermined amount, e.g., for eight pixels is performed because a measurable distance range d' is reserved in end portions of the scanning direction as in the case of the center portion thereof. A projection start angle th1, a projection completion angle th2 and a deflection angular velocity ω are defined by the following equations respectively.

$$th1 = \tan^{-1}[(\beta \times pv(np/2+8)+L)/(d+d\text{off})] \times 180/\pi$$

$$th2 = \tan^{-1}[-(\beta \times pv(np/2+8)+L)/(d+d\text{off})] \times 180/\pi$$

$$\omega = (th1 - th2)/np$$

where β is an image magnification that is equal to d/effective focal length Freal, pv is a pixel pitch, np is the number of effective pixels of the imaging surface S2 in the Y direction and L is the baseline length.

Real measurement is conducted under the conditions calculated in this way. The object Q is scanned and measurement data (slit image data) Ds for five frames per pixel is sent to the host 3. The "measurement data Ds" herein is the measurement data D1 described above. In addition, deflection conditions (deflection control data D43) and device information D10 indicating the specifications of the image sensor are also sent to the host 3. Table 1 shows primary data that the three-dimensional measuring device 2 sends to the host 3.

TABLE 1

| | Data details | | Data range |
|---|---|---|---|
| Measurement Data | bank F (frame No.) | 244 × 256 × 8 bit | 0-255 |
| | bank A (n + 2) | 244 × 256 × 8 bit | 0-255 |
| | bank B (n + 1) | 244 × 256 × 8 bit | 0-255 |
| | bank C (n) | 244 × 256 × 8 bit | 0-255 |
| | bank D (n − 1) | 244 × 256 × 8 bit | 0-255 |
| | bank E (n − 2) | 244 × 256 × 8 bit | 0-255 |
| Imaging conditions | image distance b | | 0.000-200.000 |
| | front principal point position FH projection start angle th1 deflection angular velocity ω | | 0.00-300.00 |
| Device information | the number of pixels for measurement (sampling number X and Y directions) | | 1 or more |
| | sensor pixel pitch pu, pv | | up to 0.00516 and more |
| | light projecting system posture (about X, Y and Z axes) | | 0.00-±90.00 |
| | light projecting system position (X, Y and Z axes directions) | | 0.00-±300.00 |
| | lens distortion correction coefficient | | d1, d2 |
| | sensor center pixel u0, v0 | | 0.00-256.00 |
| 2D image | R plane | 512 × 512 × 8 bit | 0-255 |
| | G plane | 512 × 512 × 8 bit | 0-255 |
| | B plane | 512 × 512 × 8 bit | 0-255 |

Upon setting the projection start angle th1 and the projection completion angle th2, if the following equations are used instead of the equations described above, a measurable distance range can be shifted in the optical axis direction.

$$th1 = \tan^{-1}[(\beta \times pv(np/2+8+\text{pitchoff})+L)/(d+d\text{off})] \times 180/\pi$$

$$th2 = \tan^{-1}[-(\beta \times pv(np/2+8+\text{pitchoff})+L)/(d+d\text{off})] \times 180/\pi$$

where pitchoff is a shift amount of the measurable distance range.

As described later, if the reference position for calculation of the distance away from the object is set to a position adjacent to the object (the three-dimensional measuring device 2 side) and a measurable range d' is set to front and back of the position, the measurable range on the front side (the three-dimensional measuring device 2 side) is wasted in many cases. Accordingly, it is desirable that the shift amount pitchoff is set and the measurable range d' is shifted to the back side so as to have a ratio of 25% on the front side to 75% on the back side.

The host 3 calculates three-dimensional coordinates of each sampling point based on the measurement data Ds sent from the three-dimensional measuring device 2 and others.

Figure 14:
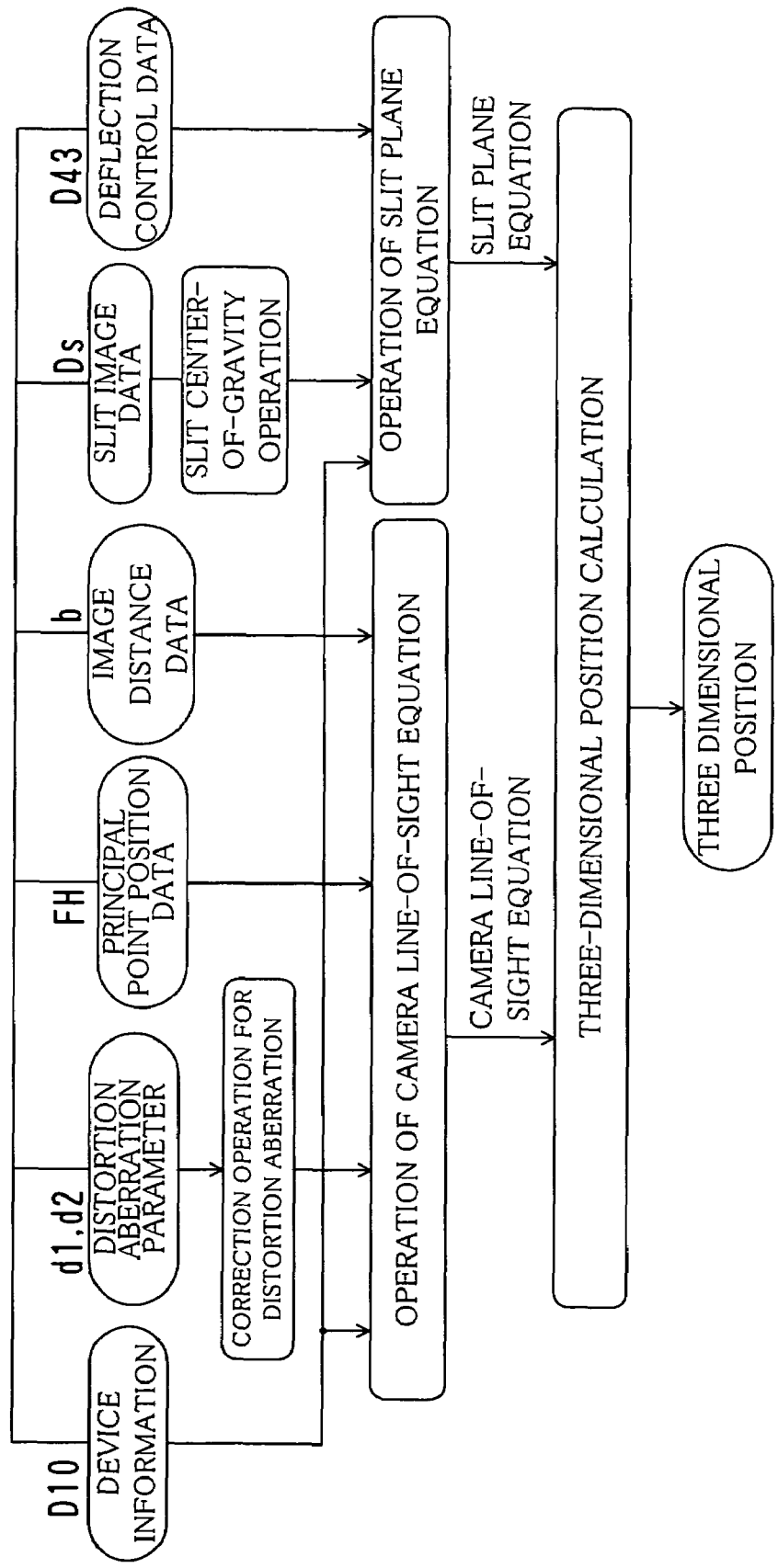
FIG. 14 is a diagram showing the flow of data in a host.
Figure 15:
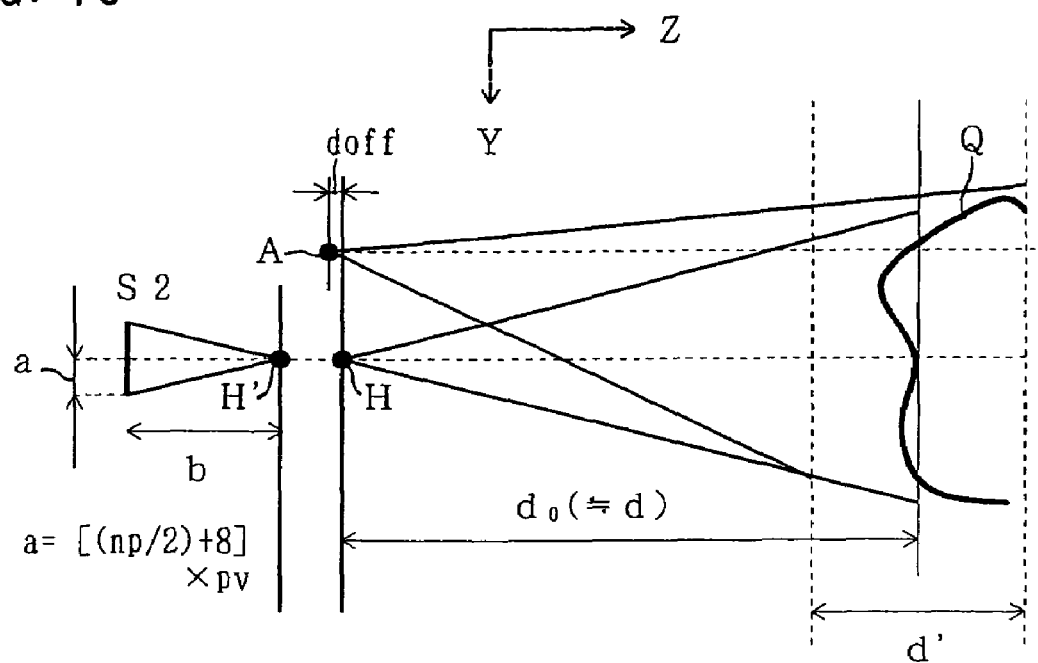
FIG. 15 is a diagram showing the positional relationship between each point of an optical system and an object.

As shown in FIG. 14, slit center-of-gravity operation, correction operation for distortion aberration, operation of the camera line-of-sight equation, operation of slit plane equation, and the three-dimensional position calculation are performed. Thereby, for example, three-dimensional positions (coordinates X, Y and Z) of 244×256 sampling points are calculated. The sampling point is the intersection point of a camera line-of-sight (the line connecting the sampling point and the front principal point H) and a slit plane (an optical axis plane of the slit light U with which the sampling point is irradiated). Parameters PM to be used for the calculation/operation are extracted from the parameter tables PT and the parameters PM thus extracted are used for the calculation/operation.

The temporal center-of-gravity Npeak (see FIG. 12) of the slit light U is defined by the following equation (4) using received light data Dg(i) for each sampling operation.

$$Npeak = n + \Delta n \qquad (4)$$

$$\Delta n = [-2 \times Dg(n-2) - Dg(n-1) + Dg(n+1) + 2 \times Dg(n+2)] / \Sigma Dg(i)$$

$$(i = n-2, n-1, n, n+1, n+2)$$

Alternatively, $$\Delta n = [-2 \times [Dg(n-2) - minDg(i)] - [Dg(n-1) - minDg(i)] + [Dg(n+1) - minDg(i) + 2 \times [Dg(n+2) - minDg(i)]]] / \Sigma Dg(i)$$

The weighted average is determined by subtracting the minimum data minDg(i) out of five pieces of the received light data, leading to the reduction in influence of environment light.

The camera line-of-sight equation is defined by the following equations (5) and (6).

$$(u - u0) = (xp) = (b/pu) \times [X/(Z - FH)] \qquad (5)$$

$$(v - v0) = (yp) = (b/pv) \times [Y/(Z - FH)] \qquad (6)$$

where b is an image distance, FH is a front principal point position, pu is a pixel pitch of the imaging surface in the horizontal direction, pv is a pixel pitch of the imaging surface in the vertical direction, u is a pixel position of the imaging surface in the horizontal direction, u0 is the center pixel position of the imaging surface in the horizontal direction, v is a pixel position of the imaging surface in the vertical direction, and v0 is the center pixel position of the imaging surface in the vertical direction.

Further, the slit plane equation is defined by the following equation (7).

$$[X-a, Y-L, Z-s] \cdot R \cdot (0, 1, 0)^t = 0 \qquad (7)$$

where a is an error along the X-axis direction, L is the baseline length and s is an offset (=doff) of the origin A.

Here, determinant R is defined by the following determinant (8).

$$\begin{bmatrix} \cos(the3) & -\sin(the3) & 0 \\ \sin(the3) & \cos(the3) & 0 \\ 0 & 0 & 1 \end{bmatrix} \cdot \begin{bmatrix} \cos(the2) & 0 & \sin(the2) \\ 0 & 1 & 0 \\ -\sin(the2) & 0 & \cos(the2) \end{bmatrix} \cdot \qquad (8)$$

$$\begin{bmatrix} 1 & 0 & 0 \\ 0 & \cos(the1 + the4 \cdot nop) & -\sin(the1 + the4 \cdot nop) \\ 0 & \sin(the1 + the4 \cdot nop) & \cos(the1 + the4 \cdot nop) \end{bmatrix}$$

where the1 is a rotation angle around the X-axis, the2 is an inclination angle around the Y-axis, the3 is an inclination angle around the Z-axis, the4 is an angular velocity around the X-axis, and nop is the time when the slit light passes, i.e. temporal center-of-gravity Npeak.

The camera line-of-sight equations and the slit plane equation (detected light plane equation) shown in equations (5), (6), and (7) are solved to calculate three-dimensional coordinates (X, Y, Z) corresponding to pixels indicated in coordinates (u, v) on the imaging surface S2.

Then, upon the application of the equations (5), (6) and (7), the parameters PM selected from the parameter tables PT are used to perform calculation.

Among the parameters PM described above, parameters of b, FH, pu, pv, u0 and v0 in the camera line-of-sight equations and parameters of th1, th2, th3, th4 and L in the slit plane equation can become the calibration parameters PMK. Each of the parameters is optimized at discrete posture positions and the optimized parameters are stored in the calibration parameter table PTK. Upon storing the parameters in the calibration parameter table PTK, values of the parameters per se may be stored or correction amounts for known design values may be stored.

As described above, in this embodiment, the point is to absorb errors associated with measurement postures by optimizing the calibration parameters PMK including parameters that are not directly related to mechanical changes, instead of directly including a mechanical bend amount or a mechanical elongation amount in the calibration parameters PMK.

Meanwhile, geometric aberration depends on an angle of view. Distortion occurs symmetrically with respect to almost the central pixel. Accordingly, a distortion amount is represented by a function of a distance away from the center pixel. Here, approximation is performed using a cubic function of a distance. A quadratic correction coefficient is denoted by d1 and a cubic correction coefficient is denoted by d2. Stated differently, pixel positions u' and v' in the light-receiving system after correction are defined by the following equations (9) and (10).

$$u' = u0 + d1 \times t2^2 \times (u - u0) + d2 \times t2^3 \times (u - u0) \qquad (9)$$

$$v' = v0 + d1 \times t2^2 \times (v - v0) + d2 \times t2^3 \times (v - v0) \qquad (10)$$

where $t2 = (t1)^{1/2}$ and $t1 = [(u-u0) \times pu]^2 + [(v-v0) \times pv]^2$.

In the equations (5) and (6), u' and v' are substituted in place of u and v, respectively. Thereby, three-dimensional coordinates in which distortion aberration is considered can be determined.

Note that, as to the three-dimensional calculation, Japanese Patent No. 3493403 can be referred to.

The following is a description of the parameter tables PT.

Referring to FIG. 16, the parameter table PT1 has angles of upward and downward postures in the horizontal axis and angles of left-faced and right-faced postures in the vertical axis. A parameter PM is stored in a frame of an intersection in the matrix. The parameter PM corresponds to a posture specified in the intersection of the horizontal axis and the vertical axis. The selection portion 12 selects from the parameter table PT1 a parameter PM corresponding to a posture of the three-dimensional measuring device 2 upon measurement therewith and reads out the selected parameter PM.

For example, in the case where the three-dimensional measuring device 2 takes the posture shown in FIG. 6B, it faces downward at 90 degrees and left at zero degrees. In such a case, a parameter PM that is stored in the frame corresponding to this posture is selected.

In the example shown in FIG. 16, although parameters PM are set for every 15 degrees, the interval of posture angles can be set to smaller values or larger values. As described earlier, the smaller interval improves the accuracy of measurement.

Referring to FIG. 17, values of pu, pv, u0, v0, th1, th2, th3 and L are stored as the calibration parameters PMK1. In this example, correction amounts for the respective parameters are stored as the calibration parameters PMK. Stated differently, for the respective parameters PM, the values of the calibration parameters PMK stored as shown in FIG. 17 are added to design values (standard values) that are determined separately. Thereby, the respective parameters PM are calibrated and the operation portion 13 performs three-dimensional calculation using the calibrated values.

For example, as to the parameter "L" of the calibration parameters PMK shown in FIG. 17, the value thereof is "0.00132" in the calibration parameters PMK1. Accordingly, this value is added to "250" that is a design value and the resultant value "250.00132" is used to perform three-dimensional calculation. Such a design value is stored in an appropriate memory area of the storage portion 11 or the operation portion 13. In addition, the parameter table PT1 shown in FIG. 16 on which the calibration parameters PMK shown in FIG. 17 are stored is the calibration parameter table PTK.

In the example shown in FIG. 17, correction amounts are stored as the calibration parameters PMK. Instead, however, the absolute values may be stored as the calibration parameters PMK. In other words, values that can be used for three-dimensional calculation without any modification and without using design values separately may be stored as the calibration parameters PMK. Alternatively, coefficients for a certain calculating formula may be stored as the calibration parameters PMK.

In this way, the calibration parameters PMK can be used to easily and accurately correct errors in measurement data D1 that occur when a posture of the three-dimensional measuring device 2 is variously changed. Thus, three-dimensional measurement can be conducted with high accuracy.

In the case where error correction parameters PMG are stored in the parameter tables PT, the simplest model is, for example, a correction magnification (1.000 times, etc.) for correcting magnification errors for the X-axis direction, the Y-axis direction and the Z-axis direction.

As shown in FIG. 18, magnifications in the X, Y and Z directions are stored as the error correction parameters PMG1. In this example, three-dimensional coordinates (X, Y, Z) in which errors are corrected are obtained by multiplying three-dimensional coordinates (X, Y, Z) of the respective points calculated by the three-dimensional calculation by values of the error correction parameters PMG stored as shown in FIG. 18.

Specifically, three-dimensional data D5 corrected by the following equations are obtained.

Figure 20:
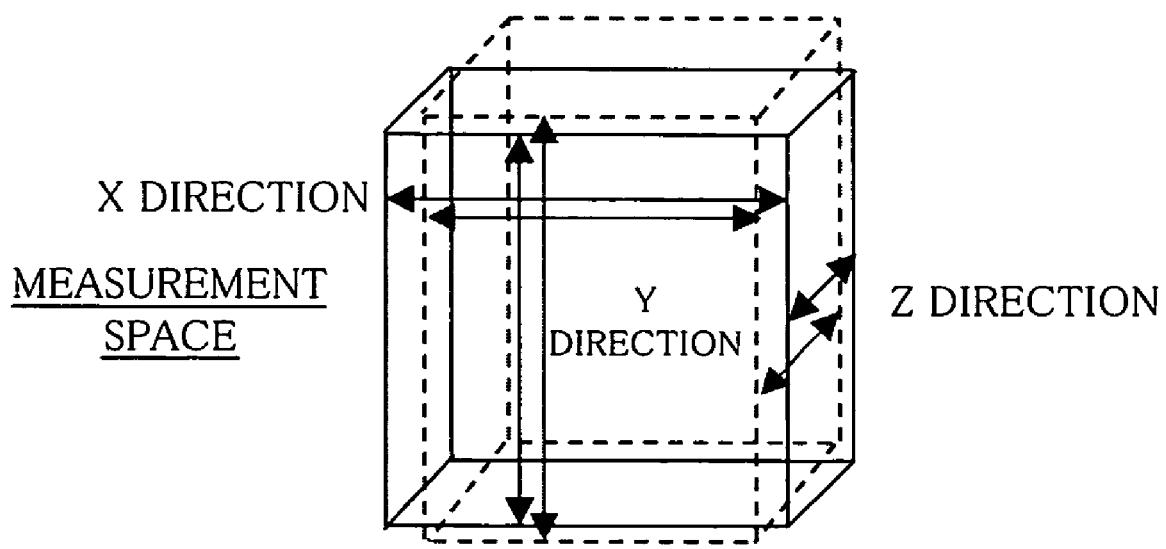
FIG. 20 is a diagram showing a state of correction using the error correction parameters.

$X$ coordinate after correction=$X$ coordinate before correction×$X$ magnification $Y$ coordinate after correction=$Y$ coordinate before correction×$Y$ magnification $Z$ coordinate after correction=$Z$ coordinate before correction×$Z$ magnification Thereby, in a measurement space as shown in FIG. 20, the three-dimensional data D5 indicated by the solid line is corrected as indicated by the broken line.

The error correction parameters PMG1 may be additional values instead of the magnifications in the X, Y and Z directions. In such a case, interpolation is performed under the circumstance in which the error correction parameters PMG are stored for all coordinates (X, Y, Z) or in which the error correction parameters PMG1 are stored discretely.

Specifically, in such a case, three-dimensional data D5 corrected by the following equations are obtained.

$X$ coordinate after correction=$X$ coordinate before correction+$X$ additional value $Y$ coordinate after correction=$Y$ coordinate before correction+$Y$ additional value $Z$ coordinate after correction=$Z$ coordinate before correction+$Z$ additional value Note that the correction operation is performed on all the pixels. In the case, for example, where the number of pixels of the image sensor is three hundred thousand, three-dimensional data of each of the three hundred thousand pixels is multiplied by the same magnification corresponding to a posture.

The parameter table PT1 shown in FIG. 16 in which the error correction parameters PMG shown in FIG. 18 are stored is the error correction parameter table PTG.

Further, each of the calibration and the error correction may be performed on the measurement data D1. Stated differently, both the calibration parameter table PTK and the error correction parameter table PTG may be used.

In the example described above, the calibration parameters PMK or the error correction parameters PMG stored in the parameter table PT are applied regardless of an environmental temperature. Instead, however, the calibration parameters PMK or the error correction parameters PMG corresponding to a temperature when the three-dimensional measuring device 2 conducts measurement may be selected. More specifically, the selection portion 12 may select and read out parameters corresponding to a temperature upon measurement with the three-dimensional measuring device 2.

The following is a description of an example in which a posture is associated with a temperature for application of the parameter tables PT.

Figure 19:
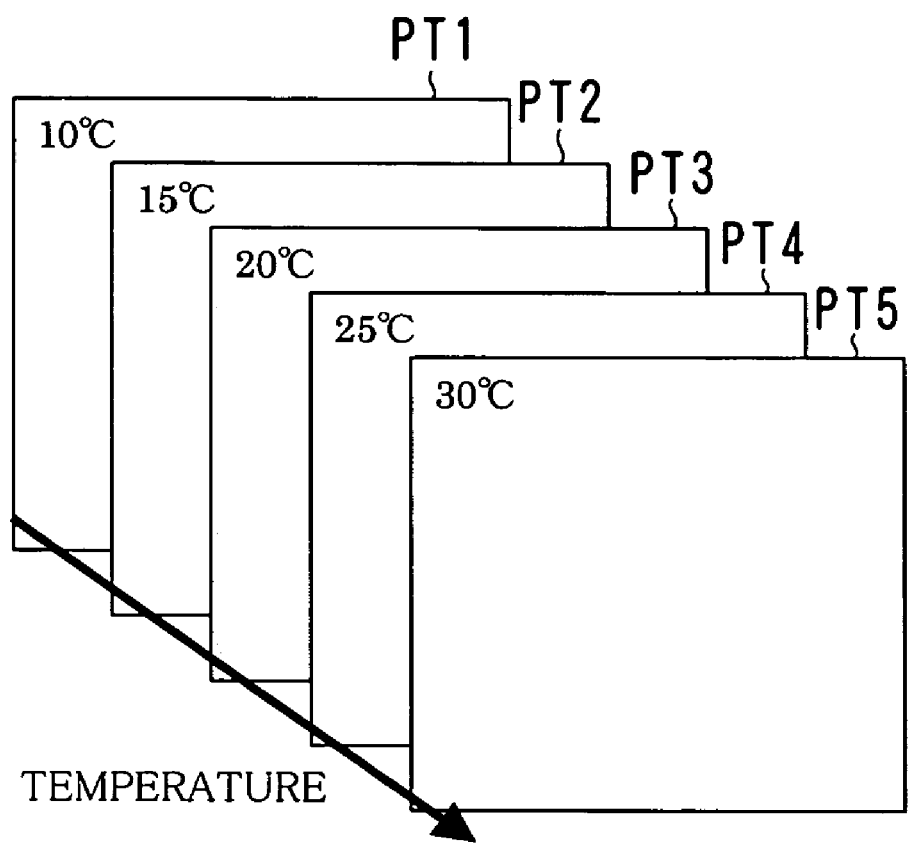
FIG. 19 is a diagram showing an example of parameter tables in which postures are associated with temperatures.

As shown in FIG. 19, the parameter tables PT1-PT5 are prepared and stored for discrete temperatures. Based on the temperature data D3 outputted by the temperature sensor SE2, a parameter table PT for a temperature corresponding to the temperature data D3 is selected. Then, parameters PM (calibration parameters PMK and error correction parameters PMG) corresponding to a posture are selected from the selected parameter table PT.

A description is provided of a method for determining, by interpolation operation, parameters PM to be used based on read out plural parameters PM when parameters PM corresponding to a posture or a temperature are selected in the parameter table PT, instead of using the parameters PM read from the parameter table PT without any modification.

Specifically, the selection portion 12 selects, from each of the parameter tables PT, two sets of parameters PM close to that of a posture of the three-dimensional measuring device 2 or close to that of a temperature.

The operation portion 13 performs interpolation operation for determining optimum calibration parameter PMK for upward "a" degrees. Linear interpolation is used as a method for the interpolation. Suppose that, for example, an optimum calibration parameter PMK is determined for pu and pv using the interpolation operation. When parameters for upward "a" degrees are denoted by pua and pva, parameters for upward "b" degrees are denoted by pub and pvb, and parameters for upward "c" degrees are denoted by puc and pvc, pua and pva are defined by the following equations.

$pua=[(puc-pub)/(c-b)] \times (a-b)+pub$ $pva=[(pvc-pvb)/(c-b)] \times (a-b)+pvb$ Likewise, the interpolation operation is performed on other parameters PM such as b, FH, u, u0, v and v0.

In this example, the description is given of an example in which parameters PM for postures at two positions are interpolated linearly. In order to obtain parameters more simply, however, a parameter PM corresponding to a closest posture, e.g., a parameter PM for upward "b" degrees may be selected as a parameter PM for upward "a" degrees without any modification.

Conversely, three parameters PM, i.e., parameters PM for upward "b" degrees, upward "c" degrees and upward "d" degrees adjacent thereto may be selected. Then, approximation may be performed using a quadratic function to perform interpolation operation. In the case where four parameters PM are used, approximation may be performed using a cubic function.

As shown in FIGS. 16 and 17, in a two-dimensional calibration parameter table PTK for storing correction amounts for design values, the case of "upward "a" degrees and left-faced "p" degrees" is assumed, for example. In left-faced "q" degrees, parameters PM for upward "a" degrees are corrected and calculated based on data for upward "b" degrees and upward "c" degrees (calculation A). In left-faced "r" degrees, parameters PM for upward "a" degrees are corrected and calculated based on data for upward "b" degrees and upward "c" degrees (calculation B). Parameters PM for left-faced "p" degrees are corrected and calculated based on the calculation A and the calculation B (calculation C). The calculation C is added to a known design value, so that a final parameter PM is obtained (see FIG. 21).

Calculation is performed in this manner and thereby a parameter PM that satisfies both upward "a" degrees and left-faced "p" degrees can be determined. Almost the same calculation results can be obtained also by a calculation procedure in which two parameters PM for left-faced "p" degrees are calculated first and then the calculation C is performed as shown in calculation D and calculation E of FIG. 21.

Concerning interpolation of error correction values for X, Y and Z coordinates, the linear interpolation is used as the interpolation method. For example, when correction amounts of X, Y and Z at upward "a" degrees are denoted by Xa, Ya and Za respectively, correction amounts of X, Y and Z at upward "b" degrees are denoted by Xb, Yb and Zb respectively, and correction amounts of X, Y and Z at upward "c" degrees are denoted by Xc, Yc and Zc respectively, Xa, Ya and Za are defined by the following equations.

$$Xa=[(Xc-Xb)/(c-b)] \times (a-b) + Xb$$

$$Ya=[(Yc-Yb)/(c-b)] \times (a-b) + Yb$$

$$Za=[(Zc-Zb)/(c-b)] \times (a-b) + Zb$$

In this example, the description is given of an example in which parameters PM for postures at two positions are interpolated linearly. In order to obtain parameters more simply, however, a correction magnification corresponding to a closest posture, e.g., a correction magnification for upward "b" degrees may be selected as a parameter PM for upward "a" degrees without any modification.

Conversely, three parameters PM, i.e., parameters PM for upward "b" degrees, upward "c" degrees and upward "d" degrees adjacent thereto may be selected. Then, approximation may be performed using a quadratic function to perform interpolation operation. In the case where four parameters PM are used, approximation may be performed using a cubic function.

Here, the error correction parameters PMG are stored in the form of correction magnifications. For the purpose of further simple operation, correction amounts may be stored and addition may be performed upon correction. Differently, for the purpose of further advanced operation, plural parameters PM may be stored as coefficients for a quadratic expression or a cubic expression including variables of X, Y and Z.

For example, the X coordinate after correction is defined by the following expression.

$$A \times (X^2) + B \times (Y^2) + C \times (Z^2) + D \times X \times Y + E \times Y \times Z + F \times Z \times X + G \times X + H \times Y + I \times Z + J$$

where A-J are the error correction parameters PMG for the X coordinate.

As shown in FIGS. 16 and 18, in a two-dimensional error correction parameter table PTG, the case of "upward "a" degrees and left-faced "p" degrees" is assumed, for example. In left-faced "q" degrees, parameters PM for upward "a" degrees are corrected and calculated based on data for upward "b" degrees and upward "c" degrees (calculation A). In left-faced "r" degrees, parameters PM for upward "a" degrees are corrected and calculated based on data for upward "b" degrees and upward "c" degrees (calculation B). Parameters PM for left-faced "p" degrees are corrected and calculated based on the calculation A and the calculation B (calculation C). FIG. 21 should be referred to.

Calculation is performed in this manner and thereby a parameter PM that satisfies both upward "a" degrees and left-faced "p" degrees can be determined. Almost the same calculation results can be obtained also by a calculation procedure in which two parameters PM for left-faced "p" degrees are calculated first and then the calculation C is performed as shown in calculation D and calculation E of FIG. 21.

As shown in FIG. 9, the combination of the laser tracker LT and the three-dimensional measuring device 2 is conventionally used for the improvement of accuracy when an object Q is measured from plural angles, information on a position and posture of the three-dimensional measuring device 2 is obtained from the laser tracker LT and these measurement data D1 are merged with one another. The correction using a posture of the three-dimensional measuring device 2 in this embodiment is combined with the combination of the laser tracker Lt and the three-dimensional measuring device 2. Thereby, the three-dimensional measurement system 1 having higher accuracy can be achieved.

The values of the parameters PM as described above are obtained by actual measurement for each three-dimensional measuring device 2. A method for obtaining values of the parameters PM is described briefly although it is known.

Figure 22:
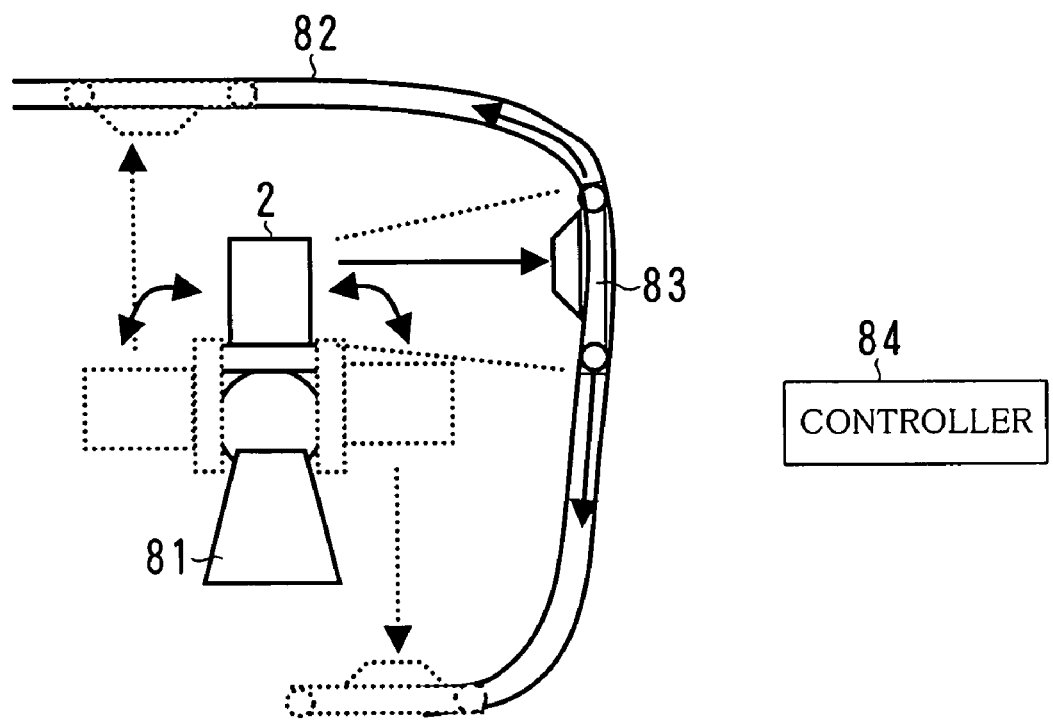
FIG. 22 is a diagram showing an example of a calibration device for obtaining parameter values.
Figure 23:
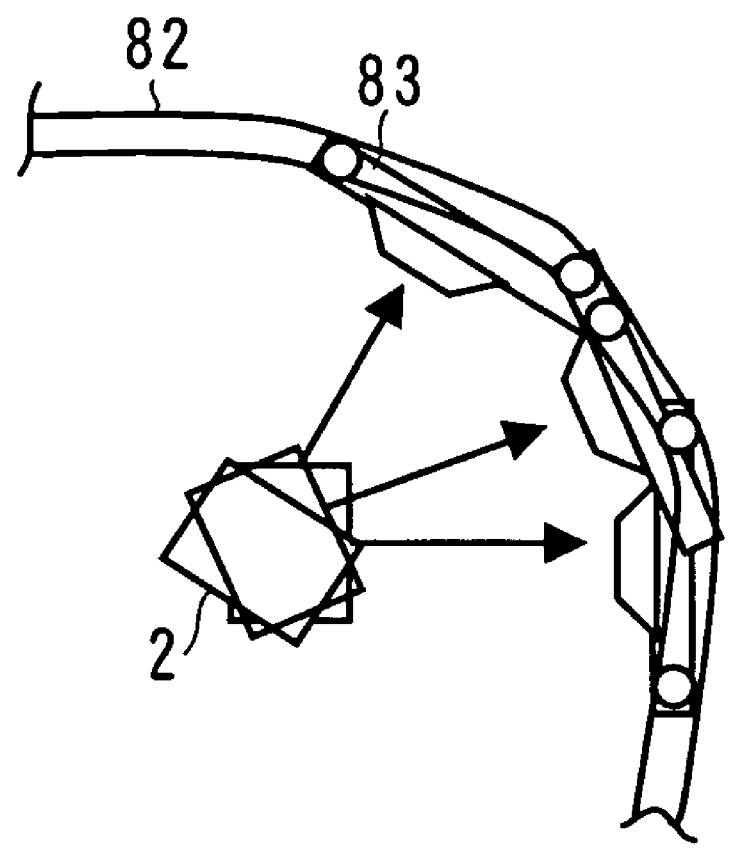
FIG. 23 is a partial enlarged view of FIG. 22.

Referring to FIGS. 22 and 23, the three-dimensional measuring device 2 is supported by a support rotating mechanism 81 and a rail 82 is provided therearound. A self-propelled calibration measurement object 83 including a power mechanism is placed on the rail 82. The support rotating mechanism 81 and the calibration measurement object 83 are controlled by a controller 84 and obtained data are captured.

The calibration measurement object 83 runs along the rail 82 and is positioned at positions slightly different from one another. In each of the positions, the support rotating mechanism 81 is rotated to position the three-dimensional measuring device 2 so that the three-dimensional measuring device 2 can conduct measurement of the calibration measurement object 83 from the front. In this way, the three-dimensional measuring device 2 conducts measurement at discrete postures and obtains calibration data. In one-time measurement, for example, data on three hundred thousand points are obtained. Based on the calibration data thus obtained, optimization operation such as least-square is used to calculate parameters PM.

Although only upward and downward postures are shown in FIGS. 22 and 23, in addition thereto, the three-dimensional measuring device 2 is adapted to change postures also in the horizontal direction.

The following is a description, with reference to flowcharts, of a process outline in the three-dimensional measurement system 1.

Figure 24:
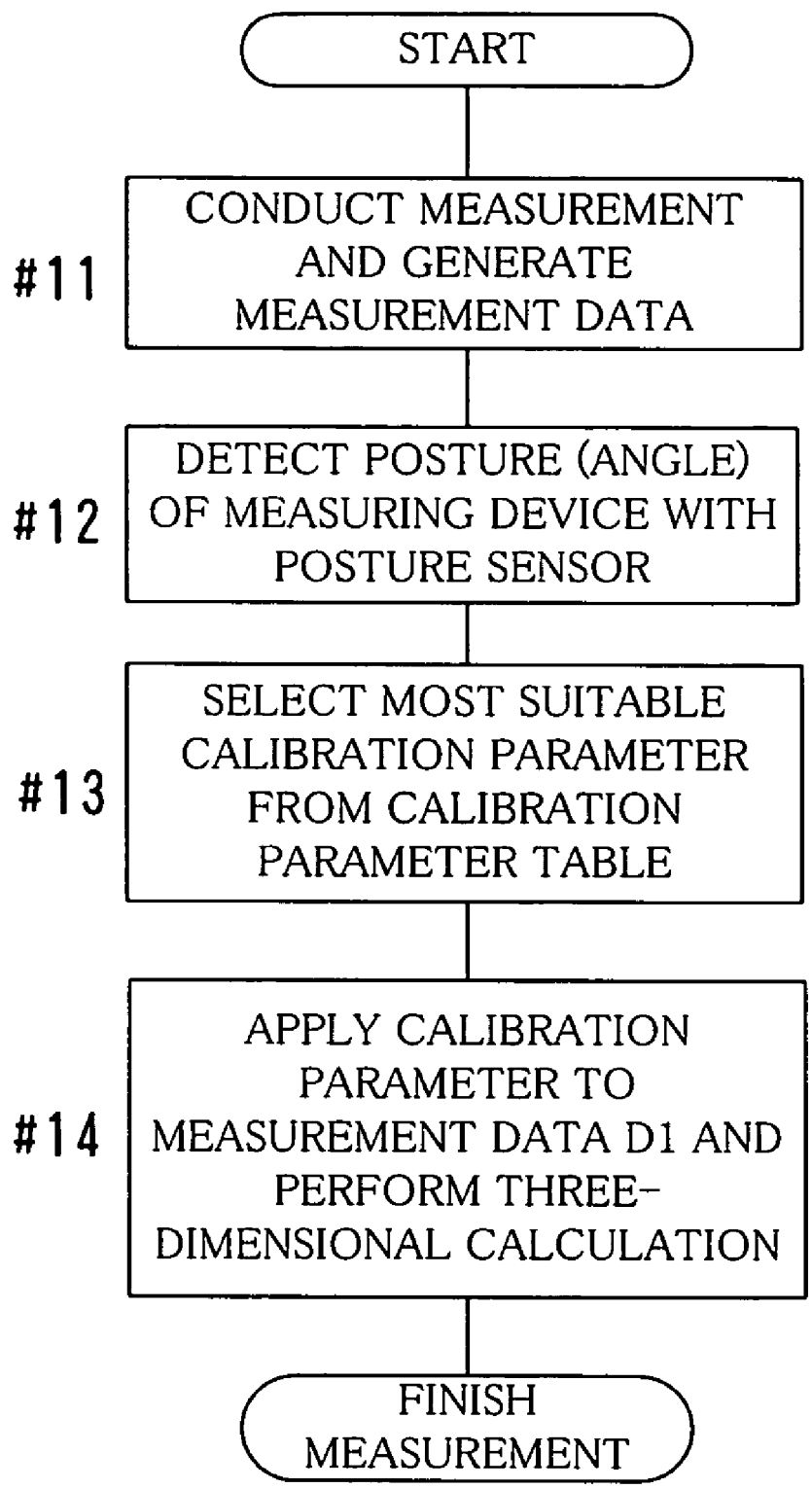
FIG. 24 is a flowchart showing a process for calibrating measurement data.

Referring to FIG. 24, the three-dimensional measuring device 2 conducts measurement of an object Q and generates measurement data D1 (#11). The posture sensor SE1 obtains posture data D2 of the three-dimensional measuring device 2 upon the measurement (#12). A calibration parameter PMK most suitable for the posture is selected from the calibration parameter table PTK (#13). The calibration parameter PMK thus selected is applied to the measurement data D1, three-dimensional calculation is performed and three-dimensional data D5 are generated (#14).

Figure 25:
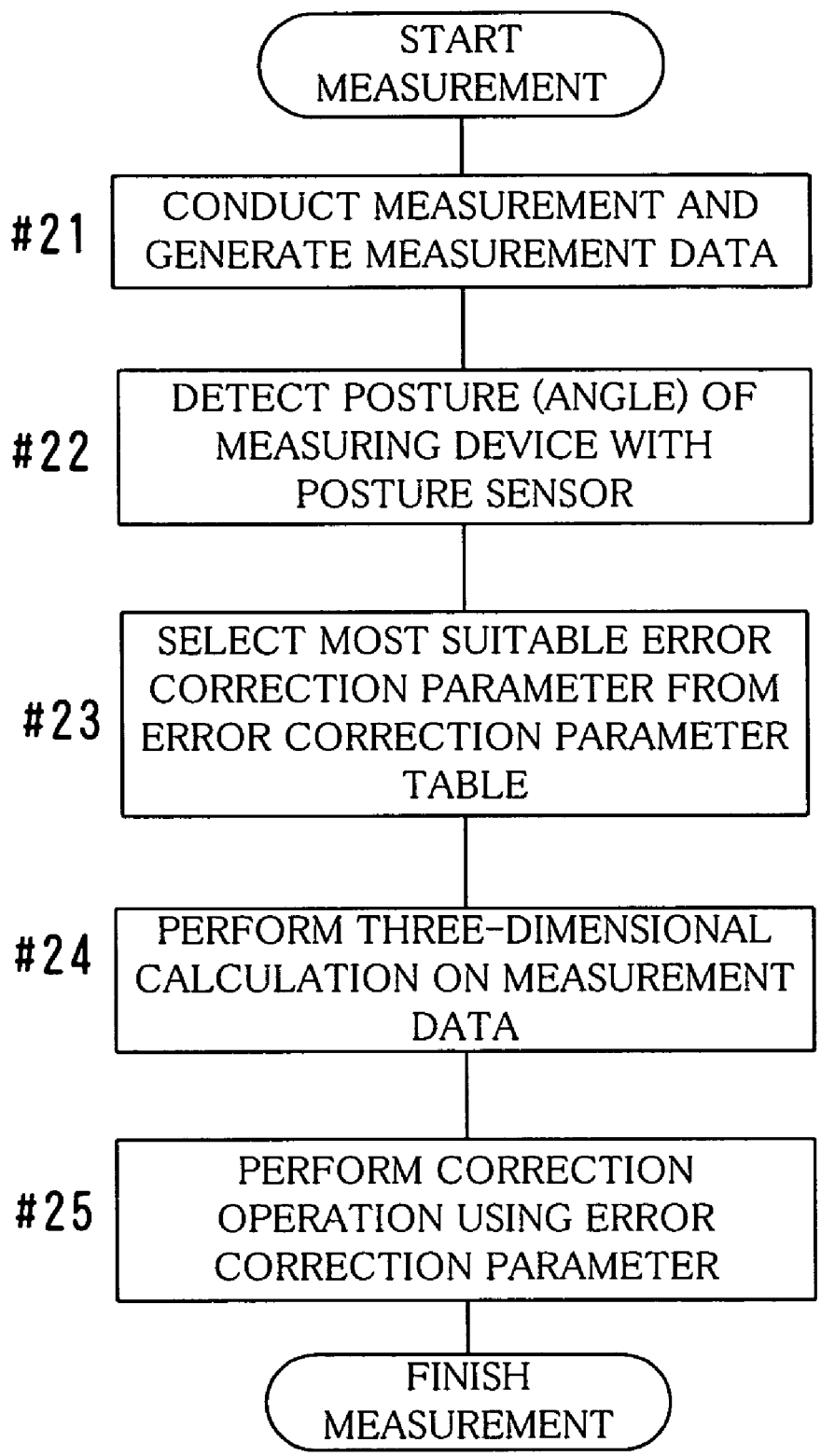
FIG. 25 is a flowchart showing a process when error correction of three-dimensional data is performed.

Referring to FIG. 25, the three-dimensional measuring device 2 conducts measurement of an object Q and generates measurement data D1 (#21). The posture sensor SE1 obtains posture data D2 of the three-dimensional measuring device 2 upon the measurement (#22). An error correction parameter PMG most suitable for the posture is selected from the error correction parameter table PTG (#23). The three-dimensional calculation is performed on the measurement data D1 using a fixed parameter irrelevant to the posture, and three-dimensional data D5 are generated (#24). The error correction operation is performed on the generated three-dimensional data D5 using the error correction parameter PMG, so that corrected three-dimensional data D5 is obtained (#25).

According to the embodiments described above, even if a bend or strain occurs in the three-dimensional measuring device 2 when a posture thereof is changed upon measurement, an error (a posture difference) associated with the bend or strain can be corrected. Further, a measurement error occurring due to a mechanical bend amount or a mechanical elongation amount can be absorbed and corrected by optimizing the calibration parameters PMK and the error correction parameters PMG. Accordingly, it is possible to perform simple correction in a reliable manner compared to a correction method in which a bend amount or an elongation amount is directly measured. In addition, the increase in volume, weight and cost of a casing or a support member of the three-dimensional measuring device 2 can be prevented.

In the embodiments described above, a posture of the three-dimensional measuring device 2 may be achieved by a rotation angle about the x-axis and a rotation angle about the y-axis. In such a case, for example, 0 through 360 degrees, −180 through 180 degrees or the like may be set for each of the rotation angle about the x-axis and the rotation angle about the y-axis.

In the embodiments discussed above, the descriptions are provided of the case where the light-section method is used for measurement with the three-dimensional measuring device 2. However, the measurement method is not limited thereto. The three-dimensional measuring device 2 may conduct measurement using a pattern projection method, a stereoscopic method, a moiré method and others.

In the embodiment described above, the overall configuration of the three-dimensional measuring device 2, the host 3 and the three-dimensional measurement system 1, the configurations of various portions thereof, the shape, the function, the number and the arrangement thereof, the details of processing, the processing order, and the like may be changed as needed, in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A three-dimensional measurement apparatus for conducting measurement of a three-dimensional shape of a surface of an object, the apparatus comprising:
   a three-dimensional measuring device configured with a light-projection portion and a light-receiving portion, whereby the three-dimensional measuring device is operable to function in various angular positions while measuring the object, that conducts measurement of the three-dimensional shape of the surface of the object to obtain measurement data;
   a posture sensor that detects a posture, as an angular position of the three-dimensional measuring device with respect to a horizontal plane or plumb line for the object being measured;
   a parameter table in which parameters corresponding to a plurality of postures of the three-dimensional measuring device are stored, wherein each parameter changes when a positional relationship between the light-projection portion and the light-receiving portion becomes out of balance due to a change in posture of the three-dimensional measuring device;
   a selection portion that selects and reads out from the parameter table a parameter corresponding to the posture of the three-dimensional measuring device upon the measurement; and
   an operation portion that calculates three-dimensional shape data of the object using the measurement data and the parameter read out from the parameter table.

2. The three-dimensional measurement apparatus according to claim 1, wherein the parameter table stores the parameters discretely for postures of the three-dimensional measuring device.

3. The three-dimensional measurement apparatus according to claim 2, wherein
   at least two parameter tables are utilized, the parameter tables comprising a calibration parameter table in which a calibration parameter is stored and an error correction parameter table in which an error correction parameter is stored, wherein
   the calibration parameter is a parameter that is calibrated according to the posture of the three-dimensional measuring device and is used for determining three-dimensional coordinates of each point on the surface of the object based on the measurement data,
   the error correction parameter is a parameter for correcting, according to the posture of the three-dimensional measuring device, an error of the three-dimensional coordinates of each point on the surface of the object determined based on the measurement data, and
   the selection portion selects from the calibration parameter table one calibration parameter closest to that of the posture of the three-dimensional measuring device, and the selection portion selects from the error parameter table one error parameter closest to that of the three-dimensional measuring device.

4. The three-dimensional measurement apparatus according to claim 2, wherein
   at least two parameter tables are utilized, the parameter tables comprising a calibration parameter table in which a calibration parameter is stored and an error correction parameter table in which an error correction parameter is stored, wherein
   the calibration parameter is a parameter that is calibrated according to the posture of the three-dimensional measuring device and is used for determining three-dimensional coordinates of each point on the surface of the object based on the measurement data, the error correction parameter is a parameter for correcting, according to the posture of the three-dimensional measuring device, an error of the three-dimensional coordinates of each point on the surface of the object determined based on the measurement data, and the selection portion selects from the calibration parameter table plural calibration parameters close to that of the posture of the three-dimensional measuring device, and the selection portion selects from the error parameter table plural error parameters close to that of the posture of the three-dimensional measuring device, and the operation portion calculates the three-dimensional shape data of the object using parameters each of which is determined from the selected calibration and error correction parameters by interpolation operation.

5. The three-dimensional measurement apparatus according to claim 1, wherein a parameter stored in the parameter table is used for determining three-dimensional coordinates of each point on the surface of the object based on the measurement data and the parameter stored in the parameter table is a calibration parameter that is calibrated according to the posture of the three-dimensional measuring device.

6. The three-dimensional measurement apparatus according to claim 1, wherein a parameter stored in the parameter table is an error correction parameter used for correcting, according to the posture of the three-dimensional measuring device, an error of three-dimensional coordinates of each point on the surface of the object determined based on the measurement data.

7. The three-dimensional measurement apparatus according to claim 1, wherein at least two parameter tables are utilized, the parameter tables comprising a calibration parameter table in which a calibration parameter is stored and an error correction parameter table in which an error correction parameter is stored, wherein the calibration parameter is a parameter that is calibrated according to the posture of the three-dimensional measuring device and is used for determining three-dimensional coordinates of each point on the surface of the object based on the measurement data, the error correction parameter is a parameter for correcting, according to the posture of the three-dimensional measuring device, an error of the three-dimensional coordinates of each point on the surface of the object determined based on the measurement data, and the operation portion calculates the three-dimensional shape data of the object using the calibration parameter, the error correction parameter, or both the calibration parameter and the error correction parameter.

8. The three-dimensional measurement apparatus according to claim 1, further comprising a temperature sensor that detects a temperature of the three-dimensional measuring device, wherein the parameter table stores a parameter corresponding to a temperature of the three-dimensional measuring device, and the selection portion selects and reads out a parameter corresponding to a temperature of the three-dimensional measuring device upon the measurement.

9. The three-dimensional measurement apparatus according to claim 1, wherein the posture sensor is capable of detecting a position of the three-dimensional measuring device, and when plural pieces of three-dimensional shape data based on the measurement data obtained by conducting measurement of the object from different positions with the three-dimensional measuring device are combined, the position of the three-dimensional measuring device detected by the posture sensor is used.

10. The three-dimensional measurement apparatus according to claim 1, wherein the three-dimensional measuring device obtains the measurement data using a light section method.

11. The three-dimensional measurement apparatus according to claim 1, wherein the three-dimensional measuring device obtains the measurement data using a pattern projection method.

12. The three-dimensional measurement apparatus according to claim 1, wherein the three-dimensional measuring device obtains the measurement data using a stereoscopic method based on images captured from plural line-of-sight directions different from one another.

13. The three-dimensional measurement apparatus according to claim 1, wherein the three-dimensional measuring device obtains the measurement data by a moiré method using moiré.

14. A three-dimensional measurement method for conducting measurement of a three-dimensional shape of a surface of an object using a three-dimensional measuring device configured with a light-projection portion and a light-receiving portion, whereby the three-dimensional measuring device is operable to function in various angular positions while measuring the object, the method comprising:

providing, in advance, a posture sensor that detects a posture, as an angular position of the three-dimensional measuring device with respect to a horizontal plane or plumb line for the object being measured;

providing, in advance, a parameter table in which parameters corresponding to a plurality of postures of the three-dimensional measuring device are stored, wherein each parameter changes when a positional relationship between the light-projection portion and the light-receiving portion becomes out of balance due to a change in posture of the three-dimensional measuring device; and calculating three-dimensional shape data of the object using measurement data and a parameter, the measurement data being obtained by conducting measurement of the object with the three-dimensional measuring device and the parameter being read out from the parameter table according to the posture of the three-dimensional measuring device upon the measurement.

15. The three-dimensional measurement method according to claim 14, wherein a parameter stored in the parameter table is used for determining three-dimensional coordinates of each point on the surface of the object based on the measurement data and the parameter stored in the parameter table is a calibration parameter that is calibrated according to the posture of the three-dimensional measuring device.

* * * * *